United States Patent
Singh et al.

(10) Patent No.: US 11,683,759 B2
(45) Date of Patent: Jun. 20, 2023

(54) POWER SAVING WITH SENSOR ASSISTED MOBILE DEVICE MANAGEMENT SOFTWARE IMAGE LOAD

(71) Applicant: QUALCOMM Incorporated, San Diego, CA (US)

(72) Inventors: Gurdarshan Singh, Pleasanton, CA (US); Ananda Kishore Parasa, Hyderabad (IN); Pravin Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/016,539

(22) Filed: Sep. 10, 2020

(65) Prior Publication Data

US 2021/0112497 A1    Apr. 15, 2021

(30) Foreign Application Priority Data

Oct. 10, 2019 (IN) .............................. 201941040919
Oct. 10, 2019 (IN) .............................. 201941040927

(51) Int. Cl.
     *H04W 52/02*      (2009.01)

(52) U.S. Cl.
     CPC .............................. *H04W 52/0251* (2013.01)

(58) Field of Classification Search
     CPC . H04W 52/0251; H04W 52/00; H04W 52/02; H04W 52/0209; H04W 52/0254; H04W 52/0274; Y02D 30/70
     See application file for complete search history.

(56) References Cited

U.S. PATENT DOCUMENTS

| | | | | |
|---|---|---|---|---|
| 2005/0110746 | A1* | 5/2005 | Hou | G06F 1/325 345/158 |
| 2010/0009697 | A1* | 1/2010 | Sip | H04W 4/029 455/556.1 |
| 2013/0252674 | A1* | 9/2013 | Hsieh | H04W 52/0251 455/566 |
| 2014/0038674 | A1* | 2/2014 | Srinivasan | H04W 52/0251 455/574 |
| 2018/0011530 | A1* | 1/2018 | Gelonese | H04N 5/63 |
| 2019/0222756 | A1* | 7/2019 | Moloney | H04N 5/232411 |
| 2022/0201429 | A1* | 6/2022 | Schoenberg | H04W 52/0229 |

* cited by examiner

*Primary Examiner* — Andrew Wendell
(74) *Attorney, Agent, or Firm* — Campbell C. Chang; Sunstein LLP

(57) ABSTRACT

Techniques for extending battery life in a mobile device are provided. An example of a mobile device according to the disclosure includes at least one external motion detect sensor, a mobile device management module operably coupled to the at least one external motion detect sensor, the mobile device management module comprising at least one processor configured to detect a motion interrupt, load a partial image state into the mobile device management module, detect a motion that meets or exceeds while in the mobile device management module is in the partial image state, load a full image state into the mobile device management module, and enable the mobile device management module in a full active state.

30 Claims, 11 Drawing Sheets

POWER SAVING WITH SENSOR ASSISTED MOBILE DEVICE MANAGEMENT SOFTWARE IMAGE LOAD

CROSS-REFERENCE TO RELATED APPLICATIONS

This application claims the benefit of Indian Provisional Patent Application No. 201941040919, filed Oct. 10, 2019, entitled "POWER SAVING WITH SENSOR ASSISTED MOBILE DEVICE MANAGEMENT IMAGE LOAD," and of Indian Provisional Patent Application No. 201941040927, filed Oct. 10, 2019, entitled "SENSOR ASSISTED POWER ON FOR MOBILE DEVICE MANAGEMENT," each of which is assigned to the assignee hereof and of which the entire contents are hereby incorporated herein by reference for all purposes.

BACKGROUND

The location of a mobile device, such as a cellular telephone, an Internet of Things (IoT) device, a location tracking device, or other such mobile devices including radio communication modules and motion sensors may be useful for a number of applications such as emergency calls, navigation, direction finding, asset tracking, and Internet services. The location of a mobile device may be estimated based on information gathered from various systems such as terrestrial radio transceivers, global navigation satellite system (GNSS) receivers and other sensors. A mobile device may also be configured to send and receive location information as well as other device state information over a wireless network. These navigation and wireless communication systems may consume a significant level of power and cause a reduction of battery life in a mobile device. It is desirable to reduce the power consumed by a mobile device in order to increase battery life.

SUMMARY

An example of a method for setting an operating state of a module in a mobile device according to the disclosure includes detecting a motion interrupt, loading a partial image state into the module, detecting a motion that meets or exceeds a threshold while in the partial image state, loading a full image state into the module, and enabling the module in a full active state.

Implementations of such a method may include one or more of the following features. The motion interrupt may be generated by an external motion detect sensor. The motion interrupt may be detected by a power management integrated circuit. Detecting the motion that meets or exceeds a threshold may include detecting motion continuously for a period of time. The period of time is approximately 5 to 15 seconds. The partial image state may not include instructions for performing a navigation function or a communication function, and the full active state may include instructions for performing the navigation function or the communication function. Loading the full image state may include activating at least one of a radio frequency control module and a Wi-Fi module. Detecting the motion that meets or exceeds a threshold while in the partial image state may include receiving information from an external motion detect sensor via a serial interface protocol including at least one of I2C, Serial Peripheral Interface (SPI), and I3C. The method may include transitioning the module to a power collapse state when the module is in the full active state and the motion that meets or exceeds a threshold is not detected for a specified time period, and transitioning at least one of a radio frequency control module and a Wi-Fi module to a power save mode before the module transitions to the power collapse state.

An example of a mobile device according to the disclosure includes at least one external motion detect sensor, a mobile device management module operably coupled to the at least one external motion detect sensor, the mobile device management module comprising at least one processor configured to detect a motion interrupt, load a partial image state into the mobile device management module, detect a motion meets or exceeds a threshold while in the mobile device management module is in the partial image state, load a full image state into the mobile device management module, and enable the mobile device management module in a full active state.

Implementations of such a mobile device may include one or more of the following features. The motion interrupt may be generated by the at least one external motion detect sensor. A power management integrated circuit may be operably coupled to the at least one external motion detect sensor and the mobile device management module, wherein the power management integrated circuit is configured to detect the motion interrupt generated by the at least one external motion detect sensor, and the at least one processor is configured to detect the motion interrupt based on a signal received from the power management integrated circuit. The at least one processor may be configured to detect the motion that meets or exceeds a threshold by detecting an indication of motion generated by the at least one external motion detect sensor for a continuous period of time. The continuous period of time may be approximately 5 to 15 seconds. The partial image state may not include instructions for performing a navigation function or a communication function, and the full active state includes instructions for performing the navigation function or the communication function. A radio frequency control module may be operably coupled to the mobile device management module, such that the at least one processor is further configured to activate the radio frequency control module when enabling the mobile device management module to the full active state. A Wi-Fi module may be operably coupled to the mobile device management module, such that the at least one processor is further configured to activate the Wi-Fi module when enabling the mobile device management module to the full active state. The at least one processor may be configured to communication with the at least one external motion detect sensor via a serial interface protocol to detect the motion that meets or exceeds a threshold while the mobile device management module is in the partial image state. The at one processor may be further configured to transition the mobile device management module to a power collapse state when the mobile device management module is in the full active state and the motion that meets or exceeds a threshold is not detected for a specified time period.

An example of an apparatus for setting an operating state of a module in a mobile device according to the disclosure includes means for detecting a motion interrupt, means for loading a partial image state into the module, means for detecting a motion that meets or exceeds a threshold while in the partial image state, means for loading a full image state into the module, and means for enabling the module in a full active state.

An example of a non-transitory processor-readable storage medium according to the disclosure includes processor-readable instructions configured to cause one or more processors to set an operating state of a module in a mobile device, including code for detecting a motion interrupt, code for loading a partial image state into the module, code for detecting a motion that meets or exceeds a threshold while in the partial image state, code for loading a full image state into the module, and code for enabling the module in a full active state.

An example of a method for setting a module in a mobile device to a power save mode according to the disclosure includes detecting a no motion state, determining that the no motion state persists for a specified amount of time, configuring a motion detect sensor interrupt prior to entering the power save mode, and setting the module to the power save mode.

Implementations of such a method may include one or more of the following features. The module may be configured to detect the no motion state. An external motion detect sensor may be configured to detect the no motion state. The module may be configured to determine that the no motion state persists for the specified amount of time. The module may be a mobile device management chipset that is operably coupled to power management integrated circuit configured to determine that the no motion state persists for the specified amount of time. The power management integrated circuit may be configured to set the module to the power save mode via a signal on a system power management interface. The module may be a mobile device management chipset that is operably coupled to an external motion detect sensor, and configuring the motion detect sensor interrupt may include sending a signal from the module to the external motion detect sensor. The signal sent from the module to the external motion detect sensor may be based a serial interface protocol including I2C, Serial Peripheral Interface (SPI), or I3C. The module may include at least one of a radio frequency control module and a Wi-Fi module. Configuring the motion detect sensor interrupt may occur prior to setting the module to the power save mode.

An example of a mobile device according to the disclosure includes at least one external motion detect sensor, a mobile device management module operably coupled to the at least one external motion detect sensor, the mobile device management module comprising at least one processor configured to detect a no motion state, determine that the no motion state persists for a specified amount of time, configure a motion detect sensor interrupt in the at least one external motion detect sensor, and set the mobile device management module to a power save mode.

Implementations of such a mobile device may include one or more of the following features. The mobile device management module may be configured to receive an indication of no motion generated by the at least one external motion detect sensor, and the at least one processor may be configured to detect the no motion state based on the indication of no motion generated by the at least one external motion detect sensor. The mobile device may include a power management integrated circuit operably coupled to the at least one external motion detect sensor and the mobile device management module, such that the power management integrated circuit may be configured to receive an indication of no motion generated by the at least one external motion detect sensor, and the at least one processor may be configured to detect the no motion state based on the indication of no motion received by the power management integrated circuit. A radio frequency control module may be operably coupled to the mobile device management module, such that the at least one processor is further configured to set the radio frequency control module to a power save mode. A Wi-Fi module may be operably coupled to the mobile device management module, such that the at least one processor is further configured to set the Wi-Fi module to a power save mode. The at least one processor may be configured to utilize a serial interface protocol to configure the motion detect sensor interrupt in the at least one external motion detect sensor. The serial interface protocol may include one of I2C, Serial Peripheral Interface (SPI), or I3C.

An example of a method for activating a module in a mobile device according to the disclosure includes detecting a motion state, raising an interrupt signal in an always on module, determining that the motion state persists for a specified amount of time, activating one or more modules in a high power mode, and loading a respective software image into each of the one or more activated modules.

Implementations of such a method may include one or more of the following features. The always on module may be an external motion detect sensor. Raising the interrupt signal may be based on an interrupt configuration previously received from a mobile device management module. Determining that the motion state persists for a specified amount of time may include determining that the interrupt signal is continuously raised for the specified amount of time. Determining that the motion state persists for a specified amount of time may include determining that the interrupt signal is raised for a predetermined portion of the specified amount of time. Activating the one or more modules in the high power mode may include providing a signal to the one or more modules configured to wake the one or more modules from a power save mode. The one or more modules may include one of a mobile device management module, a radio frequency control module, and a Wi-Fi module. The respective software image may be configured to enable communication or navigation capabilities of the one or more activated modules.

An example of a mobile device according to the disclosure includes at least one external motion detect sensor configured to detect a motion state, and raise an interrupt signal, a power management integrated circuit operably coupled to the at least one external motion detect sensor, the power management integrated circuit comprising at least one processor configured to determine if the motion state persists for a specified amount of time, and activate one or more modules in a high power mode.

Implementations of such a mobile device may include one or more of the following features. The at least one processor in the power management integrated circuit may be configured to determine if the motion state persists for a specified amount of time by determining that the interrupt signal is continuously raised for the specified amount of time. The motion state may persists for a specified amount of time if the interrupt signal is raised for a predetermined portion of the specified amount of time. A mobile device management module may be operably coupled to the power management integrated circuit, the power device management module may include at least one processor configured to activate the mobile device management module in a high power mode based on a signal received from the power management integrated circuit. A radio frequency control module may be operably coupled to the mobile device management module, and the at least one processor in the mobile device management module may be configured to activate the radio frequency control module in a high power mode. Loading the respective software image into the radio frequency control module may enable communication or navigation capabilities of the radio frequency control module. A Wi-Fi module may be operably coupled to the mobile device management module, and the at least one processor in the mobile device management module is configured to activate the Wi-Fi module in a high power mode. Loading the respective software image into the Wi-Fi module may enable communication or navigation capabilities of the Wi-Fi module.

An example of an apparatus for setting a module in a mobile device to a power save mode according to the disclosure includes means for detecting a no motion state, means for determining that the no motion state persists for a specified amount of time, means for configuring a motion detect sensor interrupt prior to entering the power save mode, and means for setting the module to the power save mode.

An example of an apparatus for activating a module in a mobile device according to the disclosure includes means for detecting a motion state, means for raising an interrupt signal in an always on module, means for determining that the motion state persists for a specified amount of time, means for activating one or more modules in a high power mode, and means for loading a respective software image into each of the one or more activated modules.

An example of a non-transitory processor-readable storage medium according to the disclosure includes processor-readable instructions configured to cause one or more processors to set a module in a mobile device to a power save mode, including code for detecting a no motion state, code for determining that the no motion state persists for a specified amount of time, code for configuring a motion detect sensor interrupt prior to entering the power save mode, and code for setting the module to the power save mode.

An example of a non-transitory processor-readable storage medium according to the disclosure includes processor-readable instructions configured to cause one or more processors to active a module in a mobile device, including code for detecting a motion state, code for raising an interrupt signal in an always on module, code for determining that the motion state persists for a specified amount of time, code for activating one or more modules in a high power mode, and code for loading a respective software image into each of the one or more activated modules.

Items and/or techniques described herein may provide one or more of the following capabilities, as well as other capabilities not mentioned. In an embodiment, a module in a mobile device may be placed in a power collapse state (e.g., power save mode). An external motion detect sensor may detect motion in the mobile device and raise an interrupt. The module may perform a partial software image load to enable a partial image state based on the interrupt. In an example, the partial image state is a sensor only state. The module may be configured to detect a significant motion (i.e., a motion that meets or exceeds a threshold) while in the partial image state. If a significant motion is not detected with a specified timeout period, the module may return to the power collapse state. If significant motion is detected, the module may perform a full software image load to enable a full active state. The full active state may include software to perform navigation and communication functions. If significant motion is not observed for a specified timeout period when the module is in a full active state, the module may transition to the power collapse state. The partial image state reduces the power required by the module by reducing the need for a full image load when a detected motion is not significant. The reduction in power usage may extend the battery life of the mobile device. In an embodiment, a module in a mobile device may detect a no motion state for a timeout period to determine the mobile device is at rest. The module may configured an interrupt in an external motion detect sensor prior to entering a power save mode. The external motion sensor may detect a motion state and raise an interrupt. One or more modules may be activated if the motion persists for a specified amount of time. Software images may be loaded into the one or more activated modules. Further, it may be possible for an effect noted above to be achieved by means other than that noted, and a noted item/technique may not necessarily yield the noted effect.

DETAILED DESCRIPTION

Figure 1:
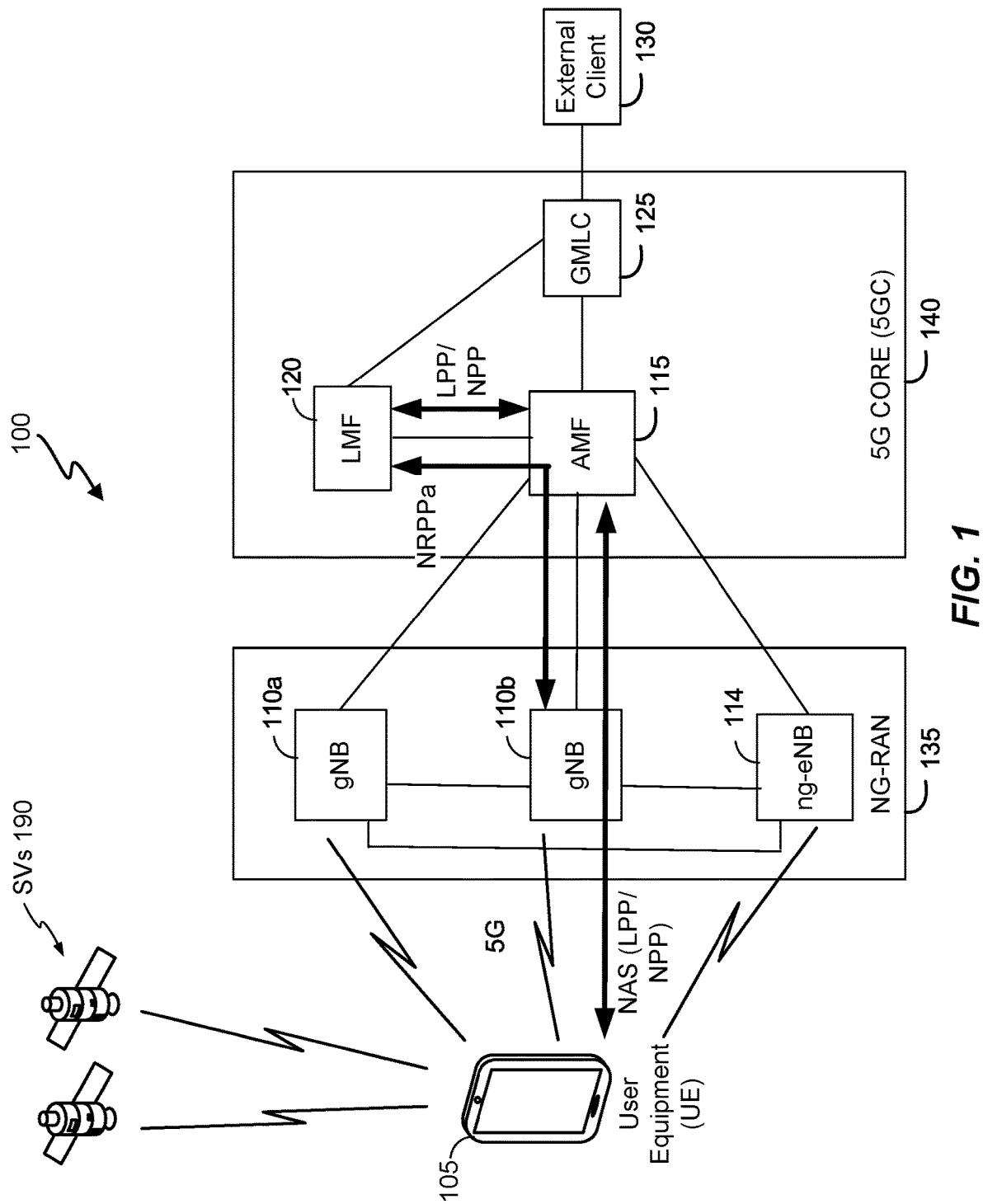
FIG. 1 is a diagram of an example communication system.

Techniques are discussed herein for extending battery life in a mobile device. In general, a small mobile device configured for Internet of Things (IoT) tracking may use significant power when the device remains in an fully active (i.e., on) state for extended periods. A fully active state generally includes full navigation and communications capabilities. Modules within the mobile device may be switched off when the device is at rest (e.g., not moving) in an effort to save power, and then switched back on when motion is detected. When the modules are switched back on, a full software image load is required to enable the communication and navigation capabilities of the mobile device. Such a full software image load requires increased processing power and thus increases the power required by the modules. In some scenarios, a short motion may be detected (e.g., a fidget) and modules associated with the communication and navigation can be activated unnecessarily. For example, in use cases such as asset, luggage and freight tracking, every small motion may trigger a full software image boot which can significantly increase the power consumed by the mobile device.

In an example described herein, a power savings in the mobile device may be realized with sensor assisted software image loads. A partial image state such as a sensor only image state may be loaded into a mobile device management/modem (MDM) module when the MDM is in a power off (e.g., collapsed) state and a motion state is detected. The sensors only image state includes software configured to collect external sensor data and detect active or significant motion (i.e., a motion that does not meet or exceed a threshold). If significant motion is detected, then the MDM may be configured to load a full software image to enable navigation and communication capabilities. The full image state includes software configured to enable navigation (e.g., terrestrial and/or satellite based) and modem functionalities, in addition to logic configured to switch on other modules required for navigation and communications. If no significant motion is detected after the partial image state (e.g., sensor only) is activated, the MDM may move back to a power collapse state.

In an example, the MDM may be configured for tracking and reporting the position of the mobile device to a server (e.g., cloud). During tracking and reporting, the MDM may be in a full/high power mode to complete the required processing steps. In an example, a Wi-Fi module may also be in a full/high power mode to perform communications and Geo-fencing processes.

As described herein, an external motion sensor may be configured to detect motion, or lack of motion, of the mobile device. The external motion sensor may be configured to detect motion and inform the MDM or a Power Management Integrated Circuit (PMIC) of the motion. The MDM may configure interrupt parameters in the external motion sensor prior to entering a power off mode (e.g., power save mode). An interrupt signal generated by the external motion sensor may be used to activate the MDM from the power off mode. For example, the external motion sensor may be configured to raise an interrupt when motion is detected. The interrupt may be handled by an always on module in the mobile device, such as the PMIC. The PMIC may be configured to cause internal load software and/or firmware in the MDM to load the image (e.g., code) associated with the navigation and/or modem capabilities of the MDM. The MDM may remain in an active state until a no motion signal is detected for a specified time.

In an example, a Wi-Fi module may be configured to enter a power save mode based on a no motion signal detected by an external motion sensor or the MDM. The Wi-Fi module may be activated based on an interrupt signal generated by the external motion sensor or the MDM. These techniques are examples only, and not exhaustive.

Referring to FIG. 1, a diagram of an example communication system 100 is shown. The communication system 100 comprises a mobile device (e.g., IoT device, location tracker device, cellular telephone, or other user equipment (UE)) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The communication system 100 may utilize information from satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and next generation eNodeB (ng-eNB) 114, and the 5GC 140 includes an Access and Mobility Management Function (AMF) 115, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the LMF 120, and the GMLC 125 are communicatively coupled to each other, and the GMLC is communicatively coupled to an external client 130.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs 190, gNBs 110a-b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLIE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a-b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or hte ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
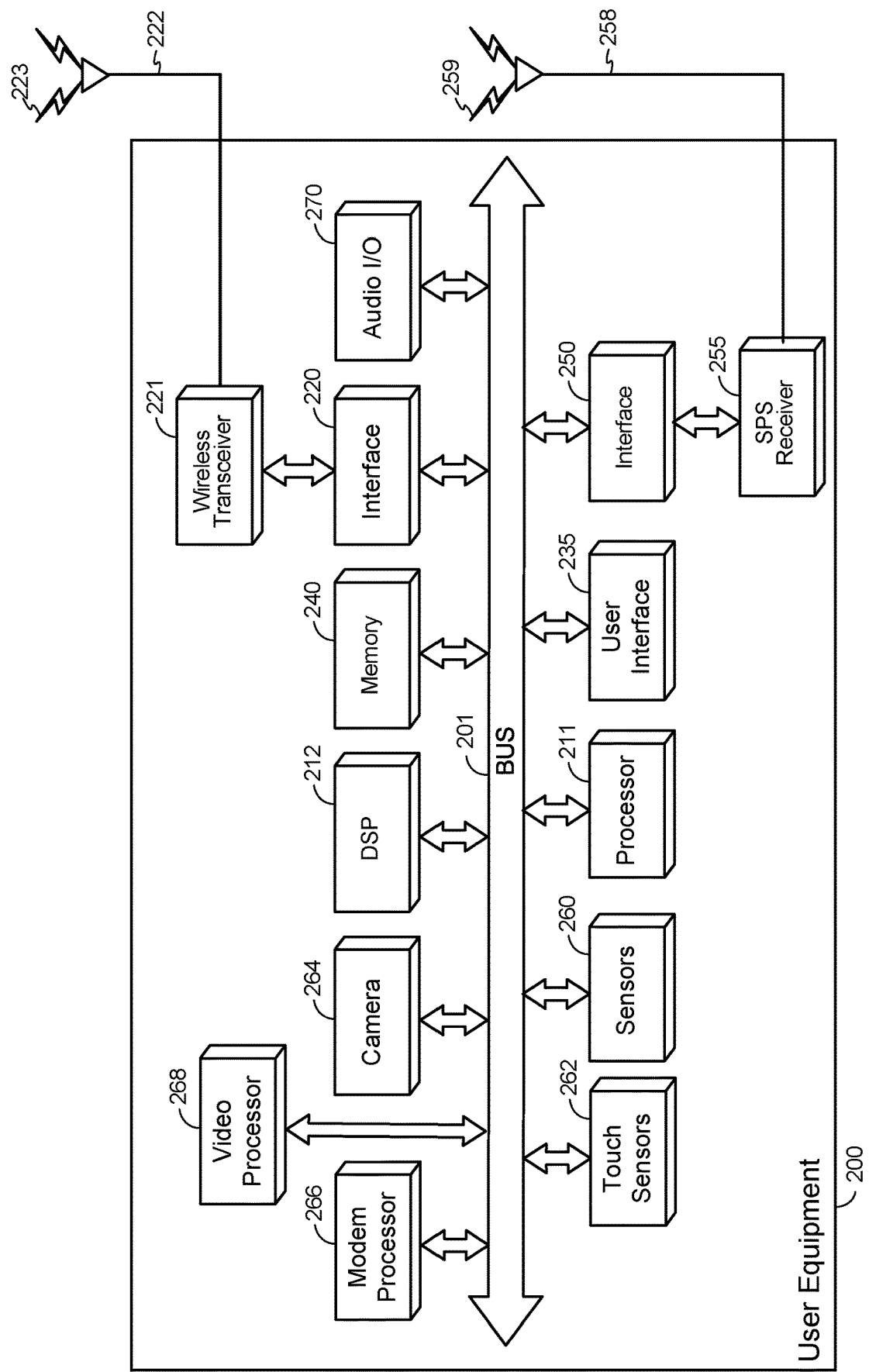
FIG. 2 is a schematic diagram of a mobile device.

Referring to FIG. 2, a schematic diagram of a mobile device 200 according to an embodiment is shown. The UE 105 as shown in FIG. 1 may comprise one or more features of the mobile device 200 shown in FIG. 2. In certain embodiments, the mobile device 200 may comprise a wireless transceiver 221 which is capable of transmitting and receiving wireless signals 223 via a wireless antenna 222 over a wireless communication network. A wireless transceiver 221 may be connected to a bus 201 by a wireless transceiver bus interface 220. The wireless transceiver bus interface 220 may, in some embodiments, be at least partially integrated with the wireless transceiver 221. Some embodiments may include multiple wireless transceivers 221 and wireless antennas 222 to enable transmitting and/or receiving signals according to corresponding multiple wireless communication standards such as, for example, versions of IEEE Standard 202.11, CDMA, WCDMA, LTE, UMTS, GSM, AMPS, Zigbee, Bluetooth®, and a 5G or NR radio interface defined by 3GPP, just to name a few examples. In a particular implementation, the wireless transceiver 221 may receive and acquire a downlink signal comprising a terrestrial positioning signal such as a PRS. For example, the wireless transceiver 221 may process an acquired terrestrial positioning signal sufficiently to enable detection of timing of the acquired terrestrial positioning signal.

The mobile device 200 may comprise an SPS receiver 255 capable of receiving and acquiring SPS signals 259 via an SPS antenna 258 (which may be the same as the antenna 222 in some embodiments). The SPS receiver 255 and interface 250 may process, in whole or in part, the acquired SPS signals 259 for estimating a location of the mobile device 200. One or more general-purpose processor(s) 211, a memory 240, one or more digital signal processor(s) (DSP(s)) 212, and/or specialized processors (not shown) may be utilized to process acquired SPS signals, in whole or in part, and/or to calculate an estimated location of the mobile device 200, in conjunction with the SPS receiver 255. Storage of SPS, TPS or other signals (e.g., signals acquired from the wireless transceiver 221) or storage of measurements of these signals for use in performing positioning operations may be performed in the memory 240 or registers (not shown). The general-purpose processor(s) 211, the memory 240, the DSP(s) 212, and/or specialized processors may provide or support a location engine for use in processing measurements to estimate a location of the mobile device 200. For example, the general-purpose processor(s) 211 or the DSP(s) 212 may process a downlink signal acquired by the wireless transceiver 221 to, for example, make measurements of RSSI, RTT, AOA, TOA, RSTD, RSRQ and/or RSRQ.

Also shown in FIG. 2, the DSP(s) 212 and the general-purpose processor(s) 211 may be connected to the memory 240 through the bus 201. A particular bus interface (not shown) may be integrated with the DSP(s) 212, the general-purpose processor(s) 211, and the memory 240. In various embodiments, functions may be performed in response to execution of one or more machine-readable instructions stored in the memory 240 such as on a computer-readable storage medium, such as RAM, ROM, FLASH, or disc drive, just to name a few examples. The one or more instructions may be executable by the general-purpose processor(s) 211, specialized processors, or the DSP(s) 212. The memory 240 may comprise a non-transitory, processor-readable memory and/or a computer-readable memory that stores software code (programming code, instructions, etc.) that are executable by the processor(s) 211 and/or the DSP(s) 212 to perform functions described herein.

Also shown in FIG. 2, a user interface 235 may comprise any one of several devices such as, for example, a speaker, microphone, display device, vibration device, keyboard, touch screen, just to name a few examples. In a particular implementation, the user interface 235 may enable a user to interact with one or more applications hosted on the mobile device 200. For example, devices of the user interface 235 may store analog and/or digital signals on the memory 240 to be further processed by the DSP(s) 212 or the general purpose processor 211 in response to action from a user. Similarly, applications hosted on the mobile device 200 may store analog or digital signals on the memory 240 to present an output signal to a user. The mobile device 200 may optionally include a dedicated audio input/output (I/O) device 270 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 200 may comprise touch sensors 262 responsive to touching or pressure on a keyboard or touch screen device.

The mobile device 200 may comprise a dedicated camera device 264 for capturing still or moving imagery. The camera device 264 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose/application processor 211 and/or the DSP(s) 212. A dedicated video processor 268 may perform conditioning, encoding, compression or manipulation of signals representing captured images. A video processor 268 may decode/decompress stored image data for presentation on a display device (not shown) on the mobile device 200.

The mobile device 200 may also comprise sensors 260 coupled to the bus 201 which may include, for example, inertial sensors and environment sensors. Inertial sensors of the sensors 260 may comprise, for example, accelerometers (e.g., collectively responding to acceleration of the mobile device 200 in three dimensions), one or more gyroscopes or one or more magnetometers (e.g., to support one or more compass applications). Environment sensors of the mobile device 200 may comprise, for example, temperature sensors, barometric pressure sensors, ambient light sensors, camera imagers, microphones, just to name few examples. The sensors 260 may generate analog and/or digital signals that may be stored in the memory 240 and processed by the DPS(s) 212 or the general purpose application processor 211 in support of one or more applications such as, for example, applications directed to positioning or navigation operations.

The mobile device 200 may comprise a dedicated modem processor 266 capable of performing baseband processing of signals received and downconverted at the wireless transceiver 221 or the SPS receiver 255. The modem processor 266 may perform baseband processing of signals to be upconverted for transmission by the wireless transceiver 221. In alternative implementations, instead of having a dedicated modem processor, baseband processing may be performed by a general purpose processor or DSP (e.g., the general purpose/application processor 211 or the DSP(s) 212). These are merely examples of structures that may perform baseband processing, and claimed subject matter is not limited in this respect.

Figure 3:
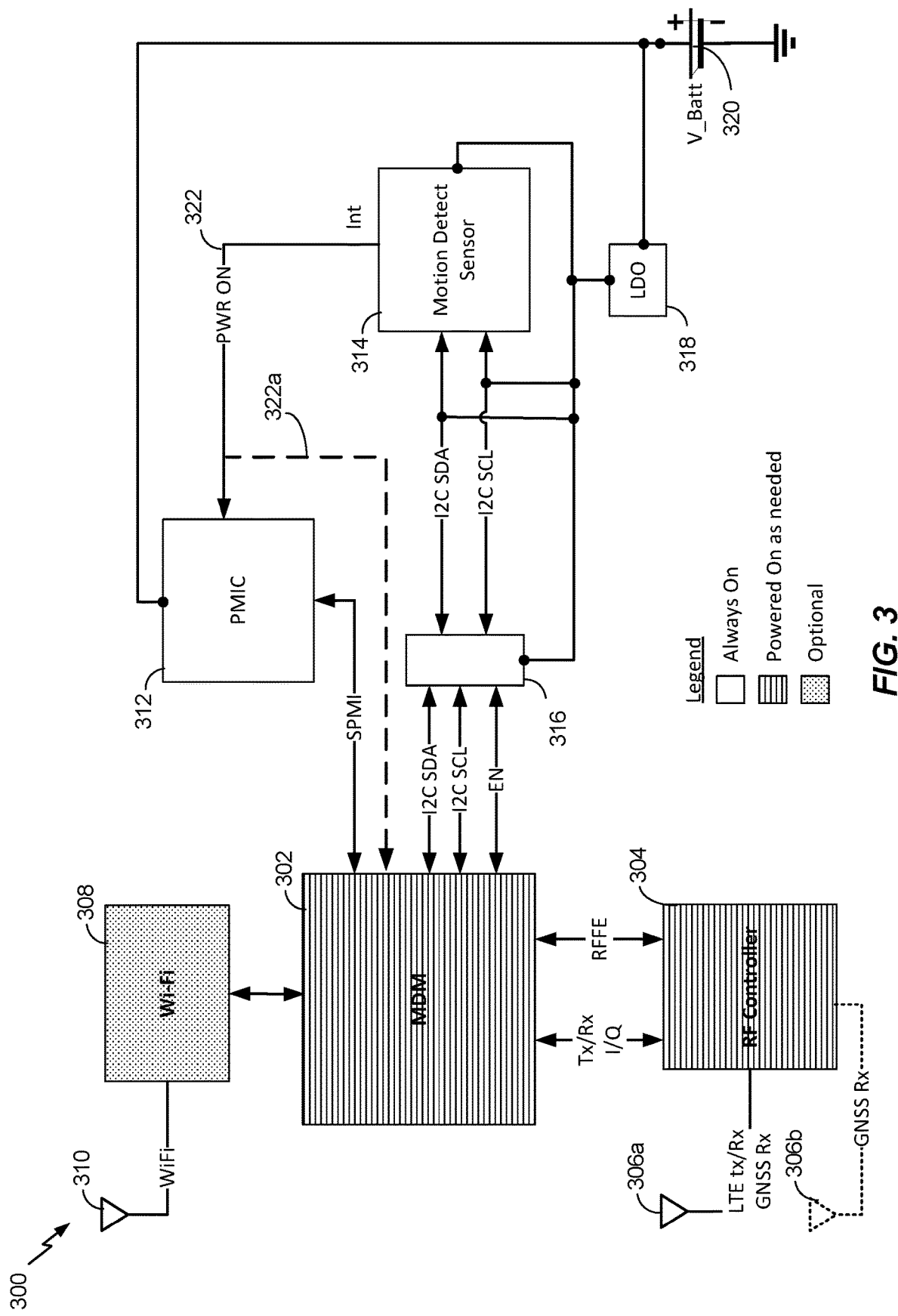
FIG. 3 is a hardware diagram for a subset of components in an example mobile device.

Referring to FIG. 3, a hardware diagram 300 for a subset of components in an example mobile device is shown. The diagram 300 includes an mobile device management/modem (MDM) module 302, an Radio Frequency (RF) control module 304, an optional Wi-Fi module 308, a power management integrated circuit (PMIC) 312, and an external motion detect sensor 314. The MDM 302 is an example of a modem processor 266 including at least one central processing unit (e.g., ARM Cortex A7), and configured as a multi-mode single chipset connectivity solution to support IoT applications such as asset trackers, health monitors, security systems, smart city sensors, smart meters, wearable trackers and other portable or moveable device utilizing wide-area connectivity in a small form factor and low-power requirements. In an example, the MDM 302 may be a chipset configured for voice services and other advanced capabilities (e.g., multi-carrier paging). The RF control module 304 is an example of a wireless transceiver 221 and a SPS receiver 255. The RF control module 304 may be a software defined radio operably coupled to the MDM 302 and one or more antennas 306a, 306b. A radio frequency reference input (RFFE) and Tx/Rx I/Q channels may be utilized between the MDM 302 and the RF control module 304. The RF control module 304 may be configured for various cellular technologies such as, for example, Rel.12 EGPRS MSC12, Rel.14 LTE Cat-M1, Rel.14 LTE and Cat-NB2. As an example, and not a limitation, the MDM 302 and the RF control module 304 may support network protocols such as IPv4/IPv6 stack with TCP and UDP, PPP, SSL, DTSL, FTP, ping, HTTTP, MQTT, OMA Lightweight M2M, CoAP. The RF control module 304 may be configured to support terrestrial and satellite based positioning. For example, the RF control module 304 may be configured to receive GPS, GLONASS, Beidou, and Galileo satellite signals as well as cellular signals used in terrestrial navigation (e.g., measurement of RSSI, RTT, RSRP, RSRQ, TOA signals). In an example, the RF control module 304 may be a radio transceiver and front-end IC.

The subset of components 300 may include an optional Wi-Fi module 308. The Wi-Fi module 308 is an example of a wireless transceiver 221. The Wi-Fi module 308 may be operably coupled to the MDM 302 and an antenna 310, and configured for single or dual-band connectivity for both 2.4 GHz and 5 Ghz applications. In an example, the Wi-Fi module 308 may be configured for IoT applications.

The PMIC 312 includes at least one processor and is an example of an Always On module. The PMIC 312 is operably coupled to the MDM 302 and the external motion detect sensor 314. In an example, the PMIC 312 may exchange signals with the MDM 302 via a system power management interface (SPMI) bus. The PMIC 312 may be configured to handle an interrupt (Int) signal generated by the external motion detect sensor 314 via an interrupt connection 322. For example, the external motion detect sensor 314 may be a commercially available always-on 3D accelerometer and 3D gyroscope circuit such as the ST Microelectronics LSM6DSL with configurable interrupt outputs (e.g., INT 1/pin 4, INT 2/pin 9) coupled to the interrupt connection 322. The external motion detect sensor 314 may be operably coupled to the MDM 302 via a mux switch 316. In an example, the mux switch 316 may be a NXP Semiconductor NX3L2G66. The MDM 302 may exchange signals with the external motion detect sensor 314 via I2C (e.g., serial data and serial clock signals as shown in FIG. 3), Serial Peripheral Interface (SPI), I3C or other protocols. In an example, an optional interrupt line 322a may operably couple the external motion detect sensor 314 to the MDM 302, and the MDM 302 may be configured to work in an interrupt trigger mode. The MDM 302 may be configured to set threshold parameters (e.g., sensitivity, zero-g offsets) associated with the interrupt signal. Thus, the interrupt output from the external motion detect sensor 314 may be a high signal (e.g., 3V, VDD_IO-0.2V) when motion above a threshold is detected, or a low signal (e.g., approximately 0.2V) when no motion above the threshold is detected. The voltages for the high and low signals are exemplary only as other analog and digital signals may be used as the interrupt signal.

A power supply 320 and voltage regulator (LDO 318) may be used with resistor networks (not shown in FIG. 3) to provide power and biasing voltages to the hardware components. In an example, the power supply is in a range of 2.4V to 4.8V. The specific hardware device manufacturers and part numbers provided herein are examples only, and not limitations, as the functionality of the components may be included in other proprietary and commercially available semiconductor chips sets.

While the hardware components depicted in FIG. 3 are shown as discrete packages, more than one component may be integrated in a System On Chip (SoC) configuration. Further, more than one external motion detect sensor device may be used.

Figure 4:
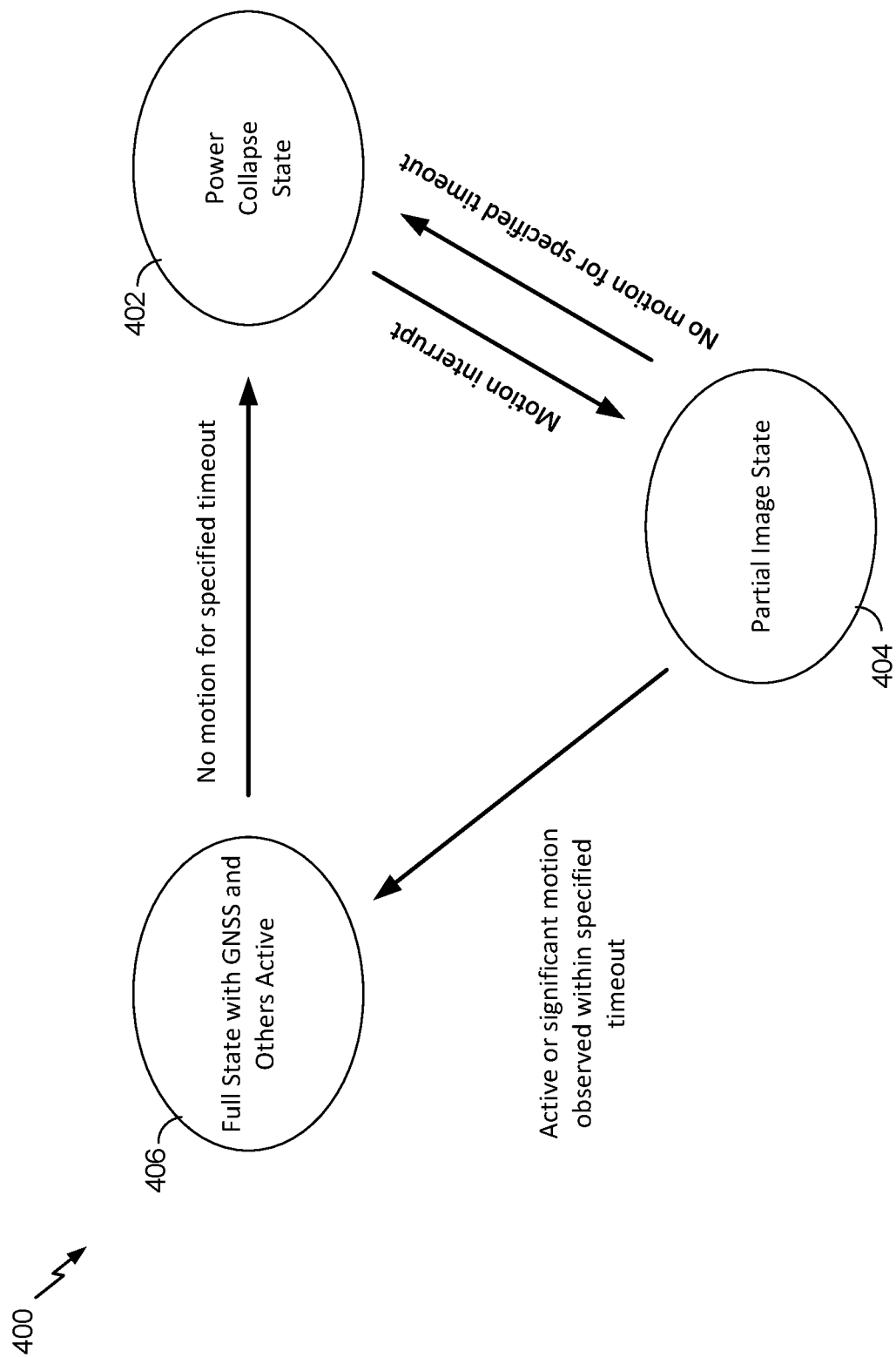
FIG. 4 is a state diagram of example sensor assisted image loads.

Referring to FIG. 4, with further reference to FIG. 3, a state diagram 400 of an example of sensor assisted image loads is shown. In operation, the MDM 302 may be configured to operate in at least three operating states including a power collapse state 402, a partial image state 404, and a full active state 406. The power collapse state 402 may be a power save mode (PSM) which may limit processor cycles to detecting raised interrupts and other power monitoring functions. The partial image state 404 is a software load that is smaller than the full active state 406. In an example, the partial image state 404 may be a sensor only state including instructions, drivers, and processing capabilities for communicating with external motion sensors and monitoring power state. The partial image state 404 may include, for example, instructions such as clock functions, operators, and data handling functions associated with other functions of a mobile device. In an example, the partial image state 404 may also be configured to detect if a user is active on the mobile device, such as when a touch sensor 262 is operated. The partial image state 404 may not include instructions for performing navigation and communication functions. The full active state 406 includes an increased set of instructions (as compared to the partial image state), such as the instructions for enabling the navigation and/or communication functions of the MDM 302. The RF control module 304, and Wi-Fi module 308 may be configured to operate in at least two power states including a power save mode (PSM) and an active mode (i.e., on). When the mobile device is at rest (i.e., no motion is detected) and the MDM 302 is in the full active state 406 with GNSS and other modules active, in one example, the MDM 302 may include motion sensors and may be configured to detect the no motion state for a specified time out. In another example, the external motion detect sensor 314 may output a low signal (e.g., approx. 0.2V) on the interrupt signal to the PMIC 312, and the PMIC 312 may signal the MDM 302 to indicate the no motion state. The MDM 302 may be configured to determine if the no motion state persists for a specified time out. If the no motion state persists for the duration of the specified time out, the MDM 302 may execute instructions to place it in a power collapse state 402 (e.g., PSM).

In another operation, when the mobile device transitions from rest to motion, and the MDM is in the power collapse state 402, the PMIC 312 and the external motion detect sensor 314 are always on components and may be configured to detect the motion. For example, when the motion is above a threshold, the external motion detect sensor 314 may raise an interrupt (e.g., output a high signal (e.g., 3V, Vox)) and the PMIC 312 may be configured to provide a motion interrupt to the MDM 302 to transition the MDM 302 from the power collapse state 402 to the partial image state 404. Upon loading the partial software image, the MDM 302 is configured to determine if the mobile device is active (e.g., based on detecting user interaction), or the current motion of the mobile device (i.e., the motion that caused the external motion detect sensor 314 to raise the interrupt) is a significant motion (i.e., a motion that meets or exceeds a threshold). In an example, the MDM 302 may be configured to communicate with the external motion detect sensor 314 via I2C/SPI/I3C to determine if the motion continues for 5-15 seconds. Continuous motion for 5-15 seconds is an example of significant motion (i.e., a motion that meets or exceeds a threshold). In other examples, a determination of significant motion (i.e., a motion that meets or exceeds a threshold) may be based on a continuous interrupt signal (e.g., a high int signal from the external motion detect sensor 314) for a fixed time period (e.g., 0.5, 1, 2, 5, 10 secs, etc.), or a sporadic/intermittent interrupt signal for a predetermined portion of a fixed time period (e.g., 50%, 60%, 80% of 0.5, 1, 2, 5, 10 secs, etc.).

Upon detection of significant motion, the MDM 302 is configured to enter a full active state 406 by performing a full state software image load, which may include software and firmware instructions to enable navigation and modem capabilities as required to upload data to a network server. The full state software image load may also include instructions configured to cause the MDM 302 to activate the RF control module 304 and/or the Wi-Fi module 308. In an example, in use cases that do not depend on cellular communication or SPS positioning, the Wi-Fi module 308 may be active and the RF control module 304 may be left in PSM. Similarly, in use cases that do not depend on Wi-Fi communications, the RF control module 304 may be activated while the Wi-Fi module 308 is left in PSM.

While in the partial image state 404, if the MDM 302 does not detect significant motion (i.e., when a motion does not meet or exceed a threshold) or activity by a user, the MDM 302 may return to a power collapse state 402.

Figure 5:
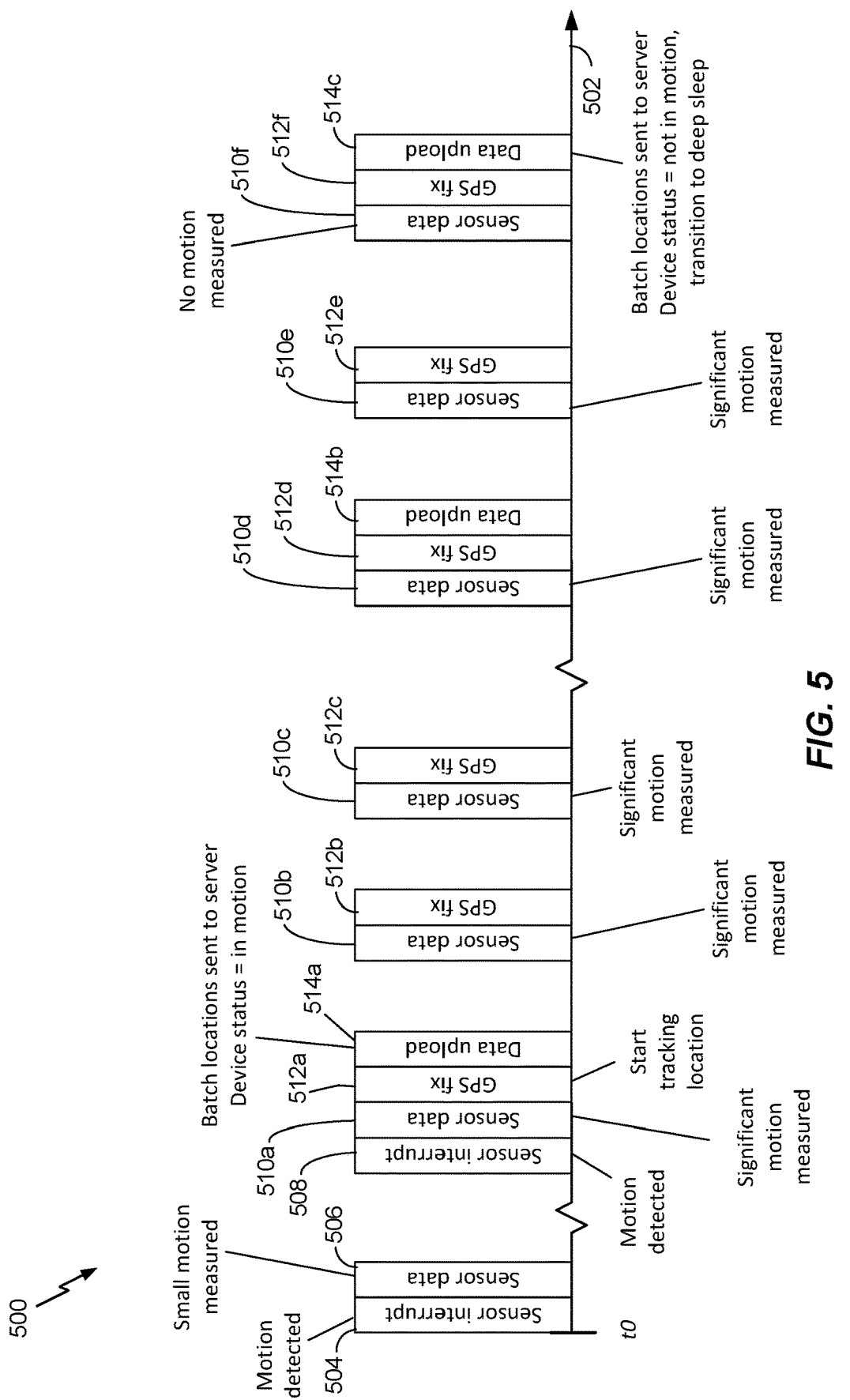
FIG. 5 is an example activity timeline for sensor assisted image loads.

Referring to FIG. 5, with further reference to FIGS. 3 and 4, an example activity timeline 500 for sensor assisted image loads is shown. The timeline 500 includes a time axis 502 beginning at time t0 on the left hand side of the axis. A plurality of example events are disposed along the timeline 500 as described herein. The MDM 302 is in a power collapse state 402 (e.g., power save mode) at time t0. At a first sensor interrupt event 504, the external detect sensor 314 detects that the mobile device is in motion. In response to the detection, the external detect sensor 314 raises an interrupt (e.g., sets the output voltage on a interrupt channel to a high state). The external motion detect sensor 314 and the PMIC 312 are examples of always on modules, and the PMIC 312 is configured to handle the interrupt generated by the external motion detect sensor 314. The PMIC 312 provides a signal to the MDM 302 via the SPMI configured to put the MDM 302 into a partial image state 404. In an example, the MDM 302 loads a partial software image configured to enable communication with the external motion detect sensor 314 via the I2C protocol. In other examples, the partial image may enable the MDM 302 to communicate with other sensors via other protocols. At a first sensor data analysis event 506, the MDM 302 determines that the motion is a small motion (i.e., a motion which does not meet or exceed a threshold). The determination that the motion is a small motion may be based on the absence of a motion meeting or exceeding a threshold. That is, the motion detected in the external motion detect sensor 314 does not persist for a specified amount of time (e.g., 5-15 secs). The MDM 302 may remain in the partial image state 404 for a predetermined timeout value (e.g., 5, 10, 20, 30 seconds) after the partial software image load in an effort to detect a motion that meets or exceeds a threshold. In an example, the MDM 302 may linger in the partial image state 404 for a predetermined timeout value (e.g., 5, 10, 20, 30 seconds) after the motion detected by the external motion detect sensor 314 drops below a threshold value. At the end of the first sensor data analysis event 506, the MDM 302 returns to the power collapse state 402.

At a second sensor interrupt event 508, the external detect sensor 314 detects that the mobile device is in motion. As previously described, in response to the detection, the external detect sensor 314 raises an interrupt which is handled by the PMIC 312. The PMIC 312 provides a signal to the MDM 302 via the SPMI to put the MDM 302 into the partial image state 404. At a second sensor analysis event 510a, the MDM 302 determines that a significant motion is detected based on signals received from the external motion detect sensor 314. In an example, a significant motion is based on continuously detecting motion for a predetermined time period (e.g., 5-15 seconds). Other signals provided by the external motion detect sensor 314 may also be used to detect a significant motion. For example, the external motion detect sensor 314 may be configured to detect a significant motion internally and provide an indication to the MDM 302. Other capabilities of the external motion detect sensor 314, such as tilt, step detection/counter, free-fall, wakeup, orientation, etc. may be used to detect a significant motion. Upon the determination that a significant motion is detected, the MDM 302 loads a full software image and enters the full active state 406.

In the full active state 406, the MDM 302 may be configured to wake the RF control module 304 and/or the Wi-Fi module 308 to respective active states. For example, in a first GPS fix event 512a, the MDM 302 is an a full active state 406 with navigation and communication functions enabled. The RF control module 304 is also in an active state with the GNSS receiver and the cellular transceiver activated. The RF control module 304 is configured to obtain positioning information such as a GPS fix (e.g., lat/long/alt). At a first data upload event 514a, the MDM 302 and the RF control module 304 are configured to provide the GPS fix data, and other sensor or application related data, to a cellular network such as described in FIG. 1. In an example, such as indoor positioning applications, the positioning information and data upload processes may utilize the Wi-Fi module 308. While in the full active state 406, the MDM 302 may continue to measure significant motion at a third data analysis event 510b, a fourth data analysis event 510c, a fifth data analysis event 510d, and a sixth data analysis event 510e. In an example, when the MDM 302 detects significant motion and the respective data analysis events 510b-e, an application executing on the mobile device may require periodic position determination and data uploads. For example, as depicted in FIG. 5, a second GPS fix event 512b, a third GPS fix event 512c, a fourth GPS fix event 512d, and fifth GPS fix event 512e may occur. Similarly, the application executing on the mobile device may require periodic data uploads such as a second data upload event 514b may occur.

At a seventh data analysis event 510f, the MDM 302 may not detect a significant motion. For example, the MDM 302 may receive a signal from the external motion detect sensor 314 indicating no motion detected. In an example, the MDM 302 may include internal motion detection devices that are accessible when the MDM 302 is in the full active state 406, or the partial image state 404. Upon a determination of no motion detected at the seventh data analysis event 510*f*, the MDM 302 may be instructed to obtain an additional GPS fix at the sixth GPS fix event 512*f* and upload relevant data at the third data upload event 514*c*. Upon completion of the third data upload event 514*c*, the MDM 302 may transition to the power collapse state 402 (e.g., deep sleep, power save mode). The number and timing of the events in the timeline 500 are examples only, and not limitations, as other applications executing on a mobile device may utilize the functionality of the MDM 302, RF control module 304 and the Wi-Fi module 308 in other ways while in full active states.

Figure 6A:
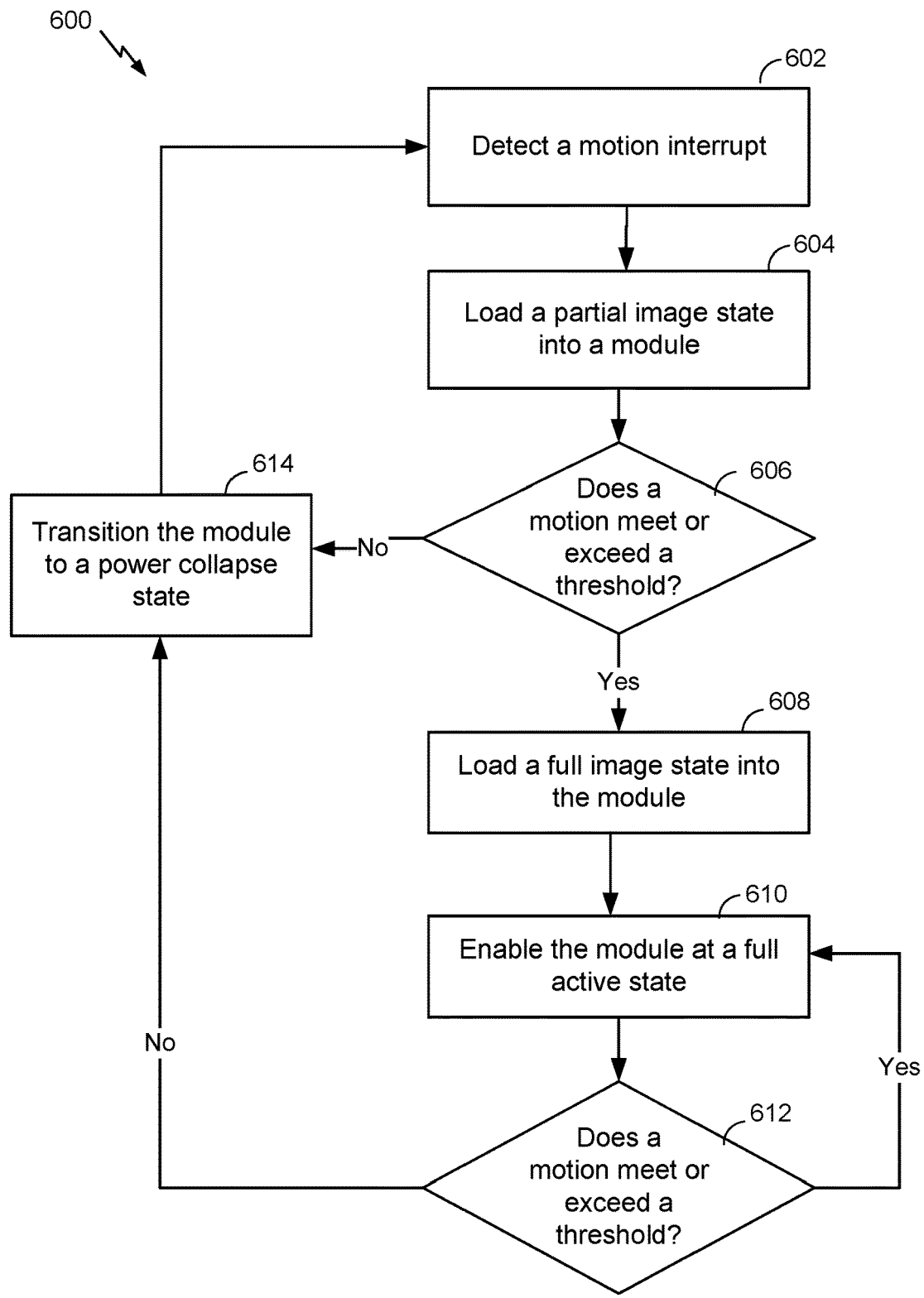
FIG. 6A is a flowchart of an example procedure for sensor assisted image loads.

Referring to FIG. 6A, with further reference to FIGS. 3 and 4, a method 600 for sensor assisted image loads includes the stages shown. The method 600 is, however, an example only and not limiting. The method 600 may be altered, e.g., by having stages added, removed, rearranged, combined, performed concurrently, and/or having single stages split into multiple stages.

At stage 602 the method includes detecting a motion interrupt. The PMIC 312 is a means for detecting a motion interrupt. The external motion detect sensor 314 may be an always-on accelerometer such as the ST LSM6DSL, but other sensors by other manufactures (e.g., InvenSense, Bosch) may be used. The external motion detect sensor 314 may include and I2C/SPI serial interface with main processor data synchronization features. The external motion detect sensor 314 is an example of a sensor 260 and is configured to detect the motion of a mobile device. The external motion detect sensor 314 may be configured to raise an interrupt and output an interrupt signal (e.g., INT1/pin 4, INT2/pin 9). The PMIC 312 is operably coupled to the external motion detect sensor 314 and configured to handle the raised interrupt. The detection of a motion may cause a interrupt output voltage (e.g., VDD_IO-0.2V as provided in the LSM6DSL specification sheet) output from the external detect sensor 314, and the PMIC 312 is configured to detect the output voltage.

At stage 604 the method includes loading a partial image state into a module. The MDM 302 is a means for loading a partial image state. The PMIC 312 is operably coupled to the MDM 302 and may be configured to interrupt the MDM 302 when a motion is detected at stage 602. In an example, loading the partial image state includes loading instructions, drivers, and processing capabilities into the MDM 302 to enable communications between the MDM 302 and external motion sensors (e.g., a sensor only state). In an example, the partial image state may be any image state that is smaller (i.e., less code) than a full image state. Loading the partial image state enables the MDM 302 in the partial image state 404 and thus does not include instructions for performing navigation and communication functions.

At stage 606 the method includes determining if a motion meets or exceeds a threshold. The MDM 302 is a means for determining if a motion meets or exceeds a threshold. The MDM 302 is configured to communicate with the external motion detect sensor 314 via a serial communication link such as I2C/SPI/I3C. The MDM 302 may receive an indication of motion from the external motion detect sensor 314 via the serial link. In general, a significant motion is a motion that meets or exceeds a threshold. In an example, determining that a motion meets or exceeds a threshold includes determining if the external motion detect sensor 314 is in a motion state for a specified amount of time. The external motion detect sensor 314 may provide an indication of motion for a continuous period of time (e.g., 0.5, 1, 2, 5, 10, secs, etc.). In an example, a motion may meet or exceed a threshold based on the external motion detect sensor 314 providing an indication of motion sporadically/intermittently for a predetermined portion of a specified time period (e.g., 50%, 60%, 80% of 0.5, 1, 2, 5, 10 secs, etc.). In an example, a motion that meets or exceeds a threshold is detected if the external motion detect sensor 314 indicates motion for 5-15 seconds. In an example, detecting that a motion meets or exceeds a threshold includes detecting if a user is active on the mobile device. If the motion meeting or exceeding a threshold is detected by the MDM 302, the MDM 302 is configured to load a full image state at stage 608. If a motion detected by the MDM 302 does not meet or exceed a threshold, the MDM 302 may transition to a power collapse state at stage 614.

At stage 608 the method includes loading a full image state into the module. The MDM 302 is a means for loading the full image state. Loading the full image state into the MDM 302 enables the module in the full active state 406 at stage 610. The full active state 406 includes an increased set of instructions (as compared to the partial image state), such as the instructions for enabling the navigation and/or communication functions of the MDM 302. In an example, the RF control module 304, and Wi-Fi module 308 may be configured to operate in at least two power states including a power save mode (PSM) and an active mode (i.e., on). When the MDM 302 is in full active state 406, the RF control module 304 and/or the Wi-Fi module 308 may also be placed in an active state as required to complete application specific navigation and communication processes.

At stage 612 the method includes determining if a motion meets or exceeds a threshold. While the MDM 302 is in the full active state 406, a detection process such as described at stage 606 may be performed continuously or periodically (e.g., 5, 10, 20, 60, 120 sec. etc.) based on applications running on a mobile device. If a motion that meets or exceeds a threshold is not detected within a timeout period (e.g., 10, 20, 60, 120 sec. etc), then the MDM 302 can transition to the power collapse state 402 at stage 614. The MDM 302 may also signal the RF control module 304 and the Wi-Fi module 308 to transition to a power save mode before entering the power collapse state 402. If a motion that meets or exceeds a threshold is detected at stage 612, the MDM 302 remains in a full active state 406 and may iterate between stages 610 and 612 until a motion that meets or exceeds a threshold is not detected.

Figure 6B:
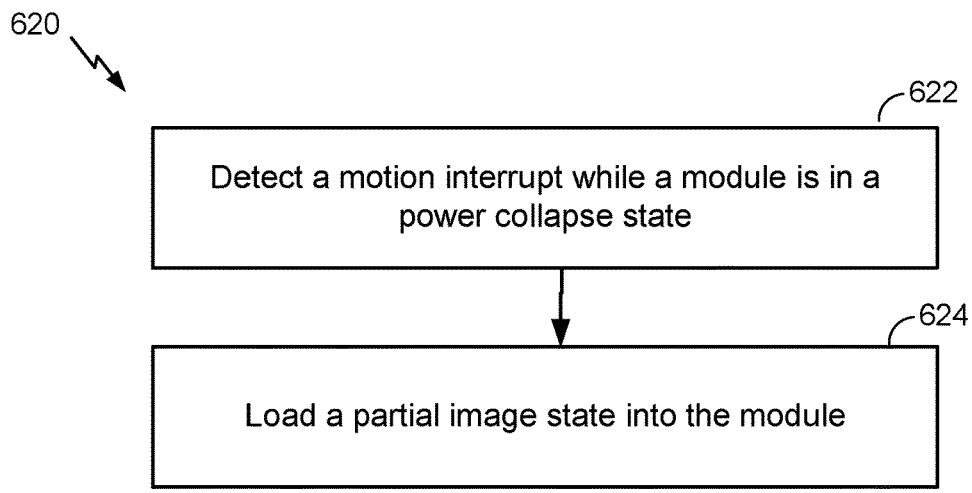
FIG. 6B is a flowchart of an example procedure for loading a partial image state into a module.

Referring to FIG. 6B, with further reference to FIGS. 3 and 4, a method 620 for loading a partial image state into a module includes the stages shown. The method 620 is, however, an example only and not limiting. The method 620 may be altered, e.g., by having stages added, removed, rearranged, combined, performed concurrently, and/or having single stages split into multiple stages.

At stage 622 the method includes detecting a motion interrupt while a module is in a power collapse state. The PMIC 312 is a means for detecting a motion interrupt. The external motion detect sensor 314 may be an always-on accelerometer configured to raise an interrupt and output an interrupt signal. The PMIC 312 may be operably coupled to the external motion detect sensor 314 and configured to handle the raised interrupt.

At stage 624 the method includes loading a partial image state into the module. The MDM 302 is a means for loading a partial image state. The PMIC 312 is operably coupled to the MDM 302 and may be configured to interrupt the MDM 302 when a motion is detected at stage 622. In an example, loading the partial image state includes loading a sensor only state including instructions, drivers, and processing capabilities into the MDM 302 to enable communications between the MDM 302 and external motion sensors. In this example, loading the sensor only image state enables the MDM 302 in the partial image state 404 and thus does not include instructions for performing navigation and communication functions. In an example, loading the partial image state includes loading drivers and other code that is a subset (e.g., smaller than) the code in a full image load.

Figure 6C:
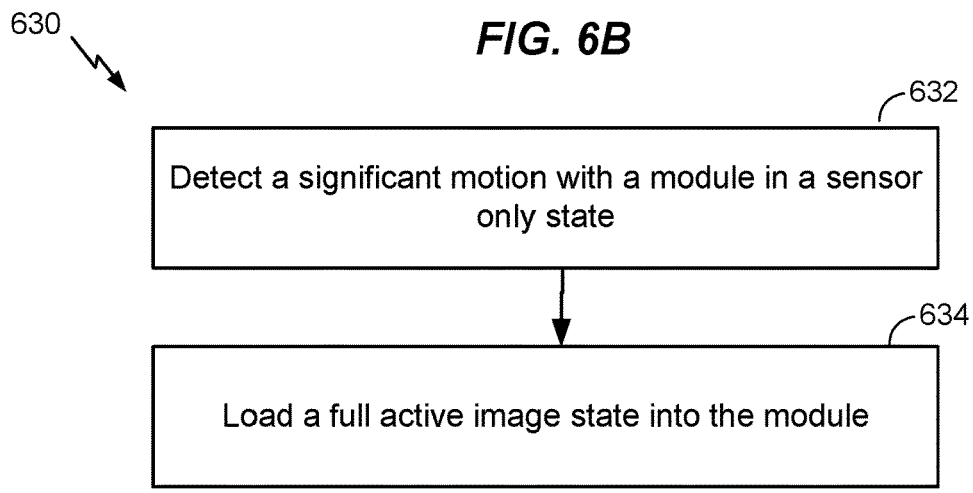
FIG. 6C is a flowchart of an example procedure for loading a full active image state into a module.

Referring to FIG. 6C, with further reference to FIGS. 3 and 4, a method 630 for loading a full active image state into a module includes the stages shown. The method 630 is, however, an example only and not limiting. The method 630 may be altered, e.g., by having stages added, removed, rearranged, combined, performed concurrently, and/or having single stages split into multiple stages.

At stage 632 the method includes detecting a significant motion with a module in a sensor only state. The MDM 302 is a means for detecting a significant motion. The sensor only state is an example of the partial image state 404. While in the partial image state 404, the MDM 302 is configured to communicate with the external motion detect sensor 314 via a serial communication link such as I2C/SPI/I3C. The MDM 302 may receive an indication of motion from the external motion detect sensor 314 via the serial link. In an example, determining that a significant motion is detected includes determining if the external motion detect sensor 314 is in a motion state for a specified amount of time. The external motion detect sensor 314 may provide an indication of motion for a continuous time period (e.g., 0.5, 1, 2, 5, 10 secs, etc.). In an example, a significant motion may be based on the external motion detect sensor 314 providing an indication of motion sporadically/intermittently for a predetermined portion of a the specified time period (e.g., 50%, 60%, 80% of 0.5, 1, 2, 5, 10 secs, etc.). A significant motion may be detected if the external motion detect sensor 314 indicates motion for 5-15 seconds. In an example, detecting a significant motion includes detecting if a user is active on the mobile device.

At stage 634 the method includes loading a full image state into the module. The MDM 302 is a means for loading the full image state. Loading the full image state into the MDM 302 enables the module in the full active state 406 and may include instructions for enabling the navigation and/or communication functions of the MDM 302. In an example, the RF control module 304 and/or the Wi-Fi module 308 may be placed in an active state when a significant motion is detected.

Figure 6D:
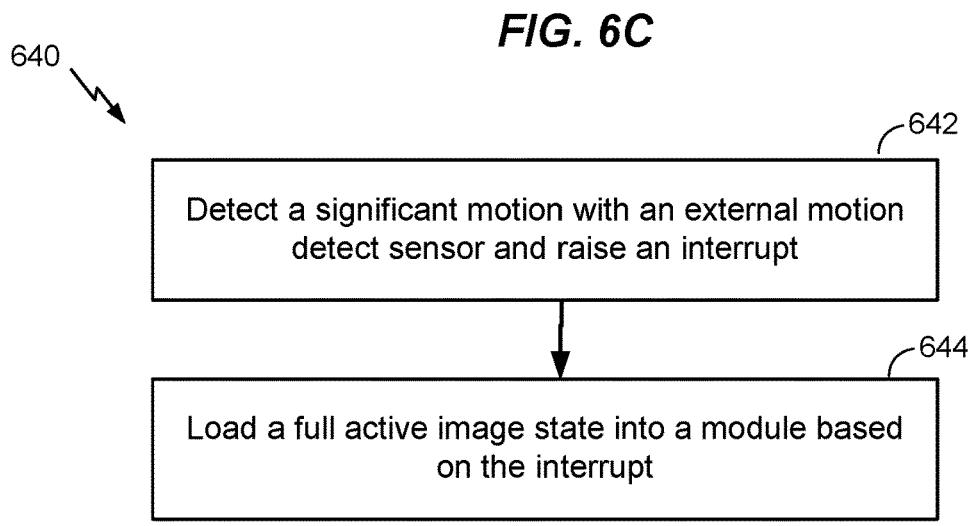
FIG. 6D is a flowchart of an example procedure for loading a full active image state into a module based on an interrupt raised in an external motion detect sensor.

Referring to FIG. 6D, with further reference to FIGS. 3 and 4, a method 640 for loading a full active image state into a module based on an interrupt raised in an external sensor includes the stages shown. The method 640 is, however, an example only and not limiting. The method 640 may be altered, e.g., by having stages added, removed, rearranged, combined, performed concurrently, and/or having single stages split into multiple stages.

At stage 642 the method includes detecting a significant motion with an external motion detect sensor and raising an interrupt. The external motion detect sensor 314 is a means for detecting a significant motion. In an example, the external motion detect sensor 314 may be configured to determine if a motion is a significant motion. If a motion is determined to be significant, then the external motion detect sensor 314 raises an interrupt (e.g., INT1/pin1, INT2/pin9).

At stage 644 the method includes loading a full image state into the module based on the interrupt. The MDM 302 is a means for loading the full image state. In an example, the MDM 302 may be configured to handle the interrupt raised by the external motion detect sensor. For example, the interrupt signal may be received directly via the optional interrupt line 322a. Loading the full image state into the MDM 302 enables the module in the full active state 406 and may include instructions for enabling the navigation and/or communication functions of the MDM 302. In an example, the RF control module 304 and/or the Wi-Fi module 308 may be placed in an active state when a significant motion is detected.

Figure 7:
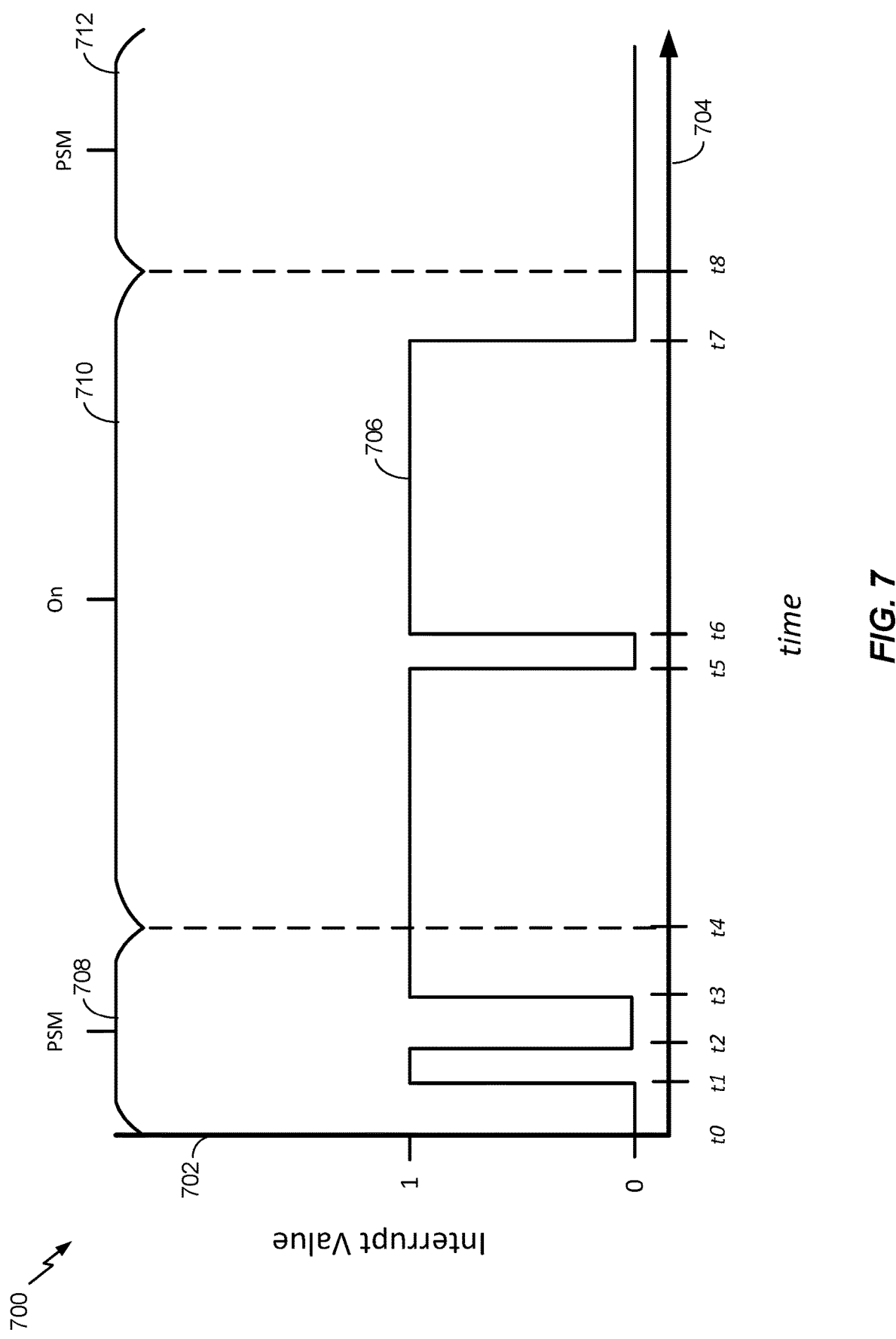
FIG. 7 is a graph of an example interrupt signal from an external motion sensor.

Referring to FIG. 7, with further reference to FIG. 3, a graph 700 of an example interrupt signal 706 from an external motion detect sensor 314 is shown. The graph 700 includes an interrupt value axis 702, a time axis 704, and an interrupt signal 706. The interrupt signal 706 represents an example interrupt output from the external motion detect sensor 314 which is handled by the PMIC 312. The interrupt value axis 702 includes a low value (0) and a high value (1). The low and high values may be based on the voltage at the interrupt output of the external motion detect sensor 314. The time axis 704 includes example times t0-t8 which correspond to changes in the interrupt signal 706. The time axis 704 also illustrates a first time period 708 between times t0 and t4, a second time period 710 between times t4 and t8, and a third time period 712 after time t8. The MDM 302 (and other modules) are in a power save mode during the first time period 708 and the third time period 712, and in an active state (e.g., on) during the second time period.

In operation, at t0 the mobile device may be at rest and the MDM 302 may be in the power save mode. The external motion detect sensor 314 may output a low interrupt value to the PMIC 312. At time t1, the external motion detect sensor 314 detects motion and the interrupt signal 706 increases to a high value for a short period before returning to a low value at time t2. The PMIC 312 may be configured to measure the duration of the high interrupt signal to determine whether the motion is a significant motion. For example, a significant motion may be determined based on a specified amount of time a high interrupt signal is received. The signal may be continuously high for a time period (e.g., 0.5, 1, 2, 5, 10 secs, etc.), or sporadically/intermittently high for a portion of a time period (e.g., 50%, 60%, 80% of 0.5, 1, 2, 5, 10 secs, etc.). As depicted in FIG. 7, the high interrupt signal 706 between t1 and t2 is not high enough for a specified amount of time and thus the PMIC 312 determines it is not a significant motion and does not wake up the MDM 302. In an example, the high interrupt signal 706 between t1 and t2 may be enough to cause a partial image state load to place the mobile device into the partial image state 404. The time required to trigger a partial image state load may be based on application and power requirements for various use cases.

At time t3, the mobile device is in motion and the external motion detect sensor 314 increases the interrupt signal 706 to a high value. The motion continues past time t4 at which point the PMIC 312 determines there is a significant motion (i.e., the duration between t3 and t4 meets the specified amount of time). At time t4, the PMIC 312 sends a wake signal to the MDM 302 to put the MDM 302 in an active state (i.e., on). In an example, referring to FIG. 6D, the MDM 302 may be configured to then activate the RF control module 304 and/or the Wi-Fi module 308 as required. The PMIC 312 may optionally be configured to place the RF control module 304 and/or the Wi-Fi module 308 in an active state concurrently with the MDM 302. In an example, referring to FIG. 6B, the MDM 302 may be configured to enter a partial image state 404 based on the significant motion.

At time t5, the external motion detect sensor 314 detects no motion and the interrupt signal 706 drops to a low value state for a short duration of time before returning to a high state at time t6. The PMIC 312 and/or the MDM 302 are configured to determine if the mobile device is in a rest state based on an amount of time a low interrupt signal is received. The specified amount of time may be configurable based on an application and may be, for example, 10 sec, 30 sec, 1 min, 5 min, 15 min, 30 min etc. While FIG. 7 depicts the interrupt signal output from the external motion detect sensor 314, in an embodiment, when the MDM 302 is active, the MDM 302 may be configured to detect a no motion state via direct communication with the external motion detect sensor 314 (e.g., via the I2C protocol), or the MDM 302 may include native motion detection capabilities that are not dependent on an external sensor. Referring back to FIG. 7, in this example the duration between t5 and t6 does not meet the specified time period and thus the MDM 302 remains in an active state (e.g., the full state 406).

At time t7, the external motion detect sensor 314 detects no motion and the interrupt signal 706 drops to a low value state for an extended period of time. For example, the duration between t7 and t8 meets the specified time to determine the mobile device is at rest and the MDM 302, and other modules (e.g., 304, 308), should be transitioned to a power save mode (e.g., the power collapse state 402). During the transition to PSM, the MDM 302 may configure the interrupt in the external motion detect sensor 314 before powering down. The MDM 302 may utilize I2C/SPI/I3C or any protocols to configure the motion detect interrupt. After configuring the interrupt, the MDM 302 may remain in PSM until the interrupt signal 706 increases as previously described.

Figure 8:
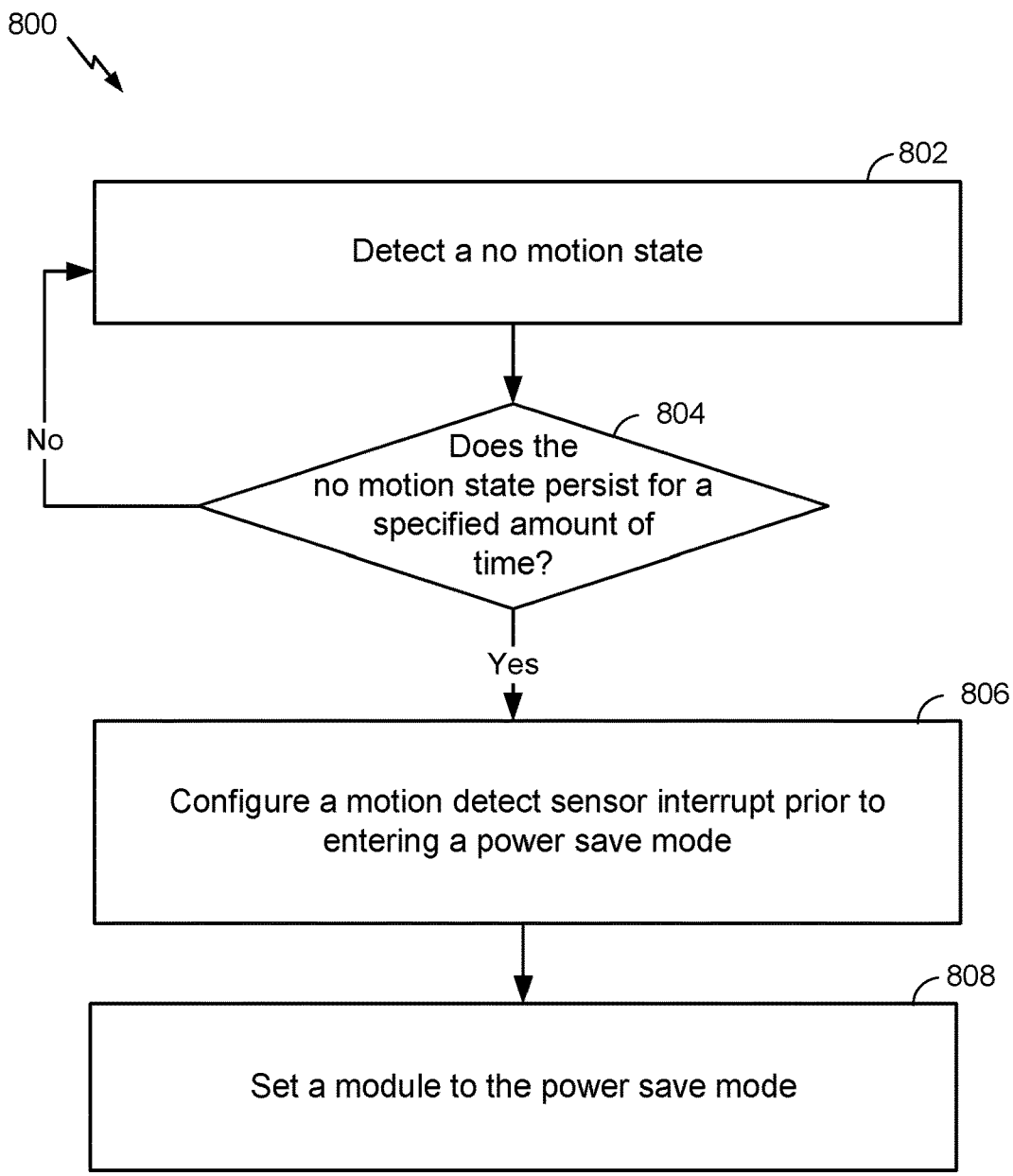
FIG. 8 is a flowchart of an example procedure for setting a module to a power save mode.

Referring to FIG. 8, with further reference to FIGS. 3 and 7, a method 800 for setting a module to a power save mode includes the stages shown. The method 800 is, however, an example only and not limiting. The method 800 may be altered, e.g., by having stages added, removed, rearranged, combined, performed concurrently, and/or having single stages split into multiple stages.

At stage 802 the method includes detecting a no motion state. The MDM 302 or the PMIC 312 may be a means for detecting a no motion state. In an example, the MDM 302 may receive an indication of no motion generated by the external motion detect sensor 314 via mux switch 316 with a communication protocol such as I2C/SPI/I3C or other suitable protocols configured to transfer signals between the MDM 302 and the external motion detect sensor 314. In an example, the PMIC 312 may detect a no motion state via an interrupt signal generated by the external motion detect sensor 314. The interrupt signal for a no motion state may be a low value (i.e., approximately 0 V) as compared to an interrupt signal for a motion state. The PMIC 312 is configured to detect the no motion state based on the low interrupt signal value. In an example, the MDM 302 may detect a no motion state based on an indication received from the PMIC 312 associated with the value of the interrupt signal generated by the external motion detect sensor. In another example, the MDM 302 may include one or more motion sensors and may be configured to detect the no motion state based on signals generated by the internal motion sensors.

At stage 804 the method includes determining if the no motion state persists for a specified amount of time. The MDM 302 or the PMIC 312 may be a means for determining if the no motion state persists. The specified amount of time may be configurable based on an application and may be, for example, 10 sec, 30 sec, 1 min, 5 min, 15 min, 30 min, 1 hr, 5 hrs, etc. In an example, the MDM 302 or the PMIC 312 may utilize a clock function to measure the duration the no motion state persists. The temporal measurement of the no motion state may continue unless a significant motion is detected. For example, if the external motion detect sensor 314 or the MDM 302 detects a motion of a short duration (e.g., less than 0.5, 1, 2, 5 secs. etc.), the no motion time measurement may continue without interruption. Conversely, if a significant motion is detected within the specified amount of time, the method returns to stage 802 and the temporal measurement of the no motion state starts anew. If the no motion state persists, or a significant motion is not detected, for the specified amount of time, then the process continues to stage 806.

At stage 806 the method includes configuring a motion detect sensor interrupt prior to entering a power save mode. The MDM 302 is a means for configuring the motion detect sensor interrupt. The persisting no motion state, or absence of a significant motion, for the specified time at stage 804 is an indication that the MDM 302 and other modules may enter a power save mode to extend battery life. The MDM 302 may configure an interrupt. In an example, the external motion detect sensor 314 may have fully configurable event-detection interrupts such as free-fall, wakeup, 6D orientation, click and double click sensing, and activity/inactivity recognition. The MDM 302 may utilize IC2/SPI/I3C or other protocols to configure the interrupt on the external motion detect sensor 314. The interrupt configuration may be used to establish the requirements of the mobile device state associated with the interrupt signal provided to the PMIC 312.

At stage 808, the method includes setting a module to a power save mode. The MDM 302 may be a means for setting a module to a power save mode. In an example, the MDM 302 may instruct the RF control module 304 and/or the Wi-Fi module 308 to enter a power save mode. The MDM 302 may also instruct itself to enter the power save mode (e.g., the power collapse state 402). While in a power save mode, the current draw of the mobile device may be significantly less (e.g., less than 20%) of the power required when the modules are in an active state.

Figure 9:
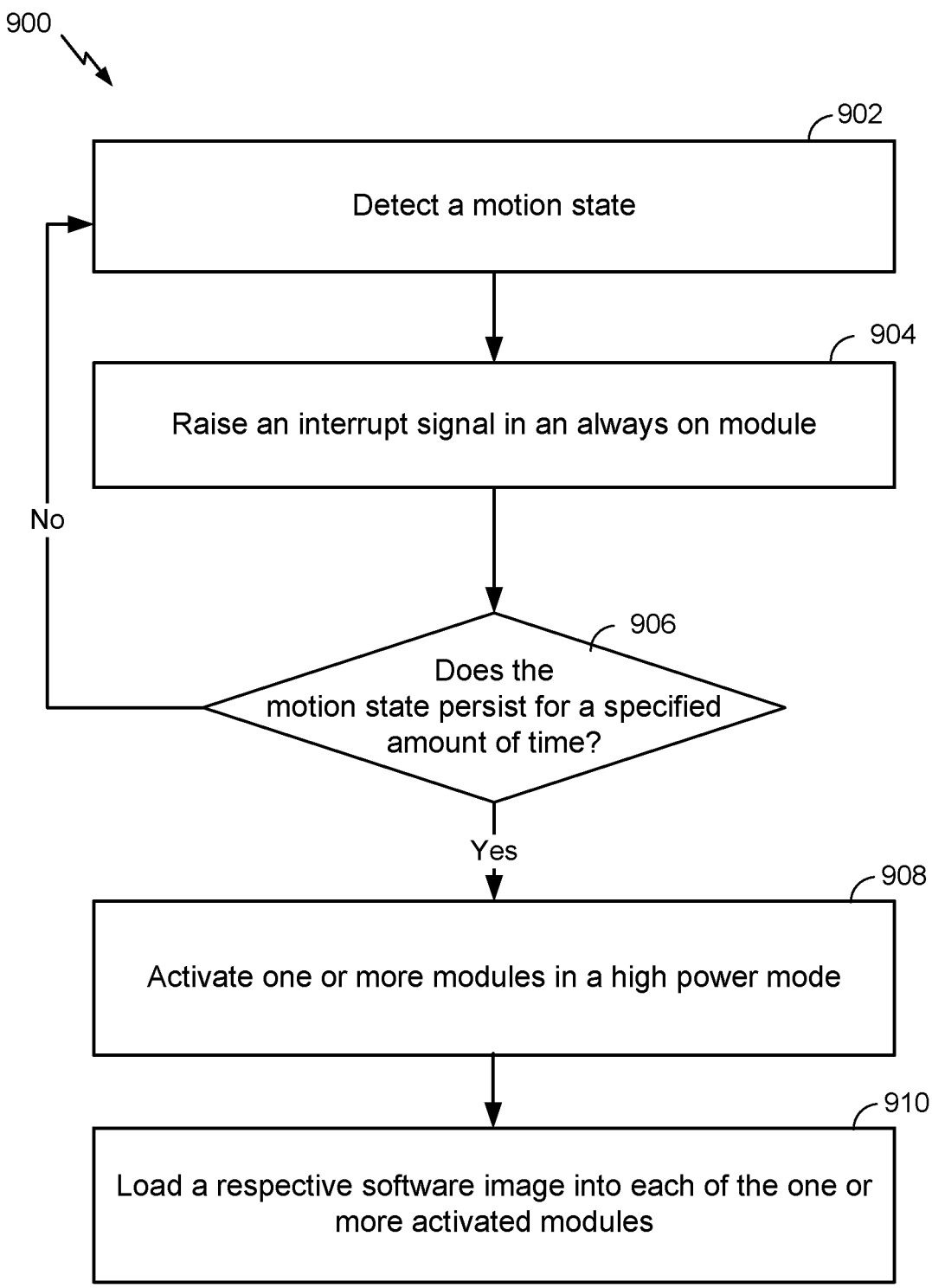
FIG. 9 is a flowchart of an example procedure for activating a module in a high power mode.

Referring to FIG. 9, with further reference to FIGS. 2, 3 and 7, a method 900 for activating a module in a high power mode includes the stages shown. The method 900 is, however, an example only and not limiting. The method 900 may be altered, e.g., by having stages added, removed, rearranged, combined, performed concurrently, and/or having single stages split into multiple stages. For example, activating modules at stage 908 may occur serially with one module being configured to active subsequent modules after loading a respective software image at stage 910.

At stage 902 the method includes detecting a motion state. The external motion detect sensor 314 is a means for detecting a motion state. The external motion detect sensor 314 may be an always-on accelerometer such as the ST LSM6DSL, but other sensors by other manufactures (e.g., InvenSense, Bosch) may be used. The external motion detect sensor 314 may include and I2C/SPI serial interface with main processor data synchronization features. The external motion detect sensor 314 is an example of a sensor 260 and is configured to detect the motion of a mobile device.

At stage 904 the method includes raising an interrupt signal in an always on module. The external motion detect sensor 314 and the PMIC 312 may be a means for raising and handling an interrupt signal. The external motion detect sensor 314 may be configured to raise an interrupt and output an interrupt signal (e.g., INT1/pin 4, INT2/pin 9). The PMIC 312 is operably coupled to the external motion detect sensor 314 and configured to handle the raised interrupt. The motion state may correspond to a high-level output voltage (e.g., VDD_IO-0.2V) output from the external detect sensor 314, and the PMIC 312 is configured to detect the output voltage.

At stage 906 the method includes determining if the motion state persists for a specified amount of time. The PMIC 312 may be a means for determining if the motion state persists. In an example, determining if the motion state persists may include determining if the detected motion is a significant motion. For example, determining if the motion state persists may include determining if a raised interrupt signal is present for the specified amount of time. The raised interrupt signal may be continuously high for a specified time period (e.g., 0.5, 1, 2, 5, 10 secs, etc.), or sporadically/intermittently high for a predetermined portion of a the specified time period (e.g., 50%, 60%, 80% of 0.5, 1, 2, 5, 10 secs, etc.). If either condition is true, the PMIC 312 determines that the motion state persists and the method continues to stage 908. If the motion state does not persist for the specified amount of time, the method iterates back to stage 902 where the external motion detect sensor 314 detects the motion state.

At stage 908 the method includes activating one or more modules in a high power mode. The PMIC 312 or the MDM 302 may be means for activating the one or more modules. The PMIC 312 may provide signals to the MDM 302 via the SPMI configured to wake the MDM 302 from the power save mode. At stage 910, the method includes loading a respective software image into each of the one or more activated modules. The MDM 302 is configure to receive an activation signal from the PMIC 312 while in the PSM and then internally load a full or partial software image. In an example, MDM 302 may perform a full software load to enter the full active state 406 with navigation and wireless communication capabilities enabled. In another example, a partial image load may be used to put the MDM 302 into the partial image state 404. The MDM 302 may be configured to send activation signals to the RF control module 304 and/or the Wi-Fi module 308, which will then load the software images associated with the respective modules. In an example, the software images for the RF control module 304 and the Wi-Fi module 308 may be stored within the respective modules or the MDM 302.

Figure 10:
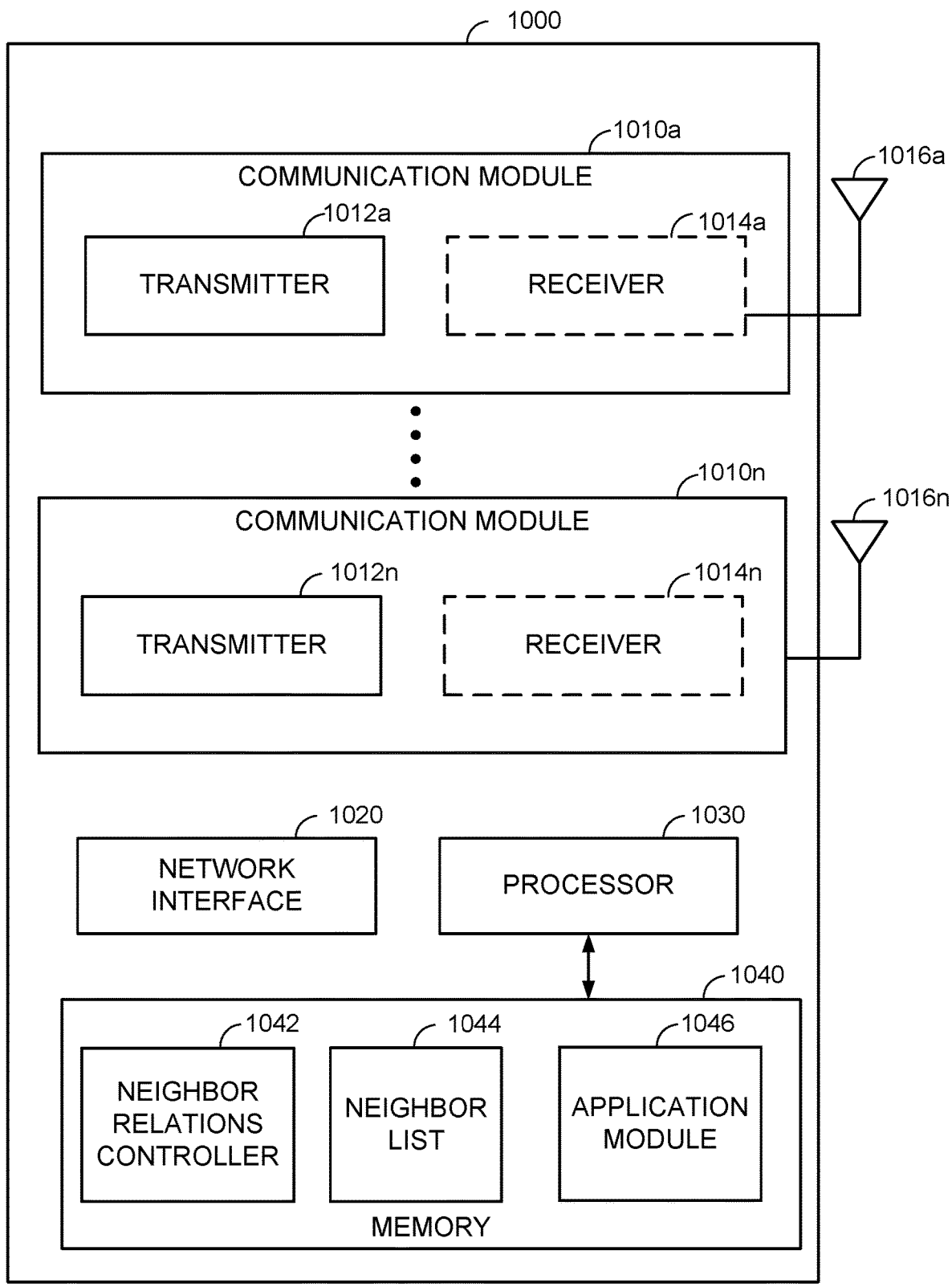
FIG. 10 is a schematic diagram of an example wireless node (such as a base station, access point, or server).

Referring to FIG. 10, a schematic diagram of an example wireless node 1000 is shown. The wireless node 1000 may be a base station, access point, or server, which may be similar to, and be configured to have a functionality similar to that of, any of the various nodes depicted, for example, in FIG. 1 (e.g., the gNBs 110a, 110b, the ng-eNB 114, the LMF 120, and/or components of the 5GC 140), or otherwise discussed herein. The wireless node 1000 may include at least one communication module 1010a-1010n (where 'n' denotes n number of modules), which may be electrically coupled to one more antennas 1016a-1016n for communicating with wireless devices, such as, for example, the UE 105. Each of the communication modules 1010a-1010n may include a respective transmitter 1012a-1012n for sending signals (e.g., downlink messages) and, optionally (e.g., for nodes configured to receive and process uplink communications) a respective receiver 1014a-1014n. In embodiments in which the implemented node includes both a transmitter and a receiver, the communication module comprising the transmitter and receiver may be referred to as a transceiver. The node 1000 may also include a network interface 1020 to communicate with other network nodes via wireline means (e.g., by sending and receiving queries and responses). For example, the node 1000 may be configured to communicate (e.g., via wired or wireless backhaul communication) with a gateway, or other suitable device of a network, to facilitate communication with one or more core network nodes (e.g., any of the other nodes and elements shown in FIG. 1). Additionally or alternatively, communication with other network nodes may also be performed using the communication modules 1010a-1010n and/or the respective antennas 1016a-1016n.

The node 1000 may include other components that may be used with embodiments described herein. For example, the node 1000 may include, in some embodiments, at least one processor (also referred to as a controller) 1030 to manage communications with other nodes (e.g., sending and receiving messages), to generate communication signals and to provide other related functionality. For example the node 1000 may be configured to receive data uploads 514a-c which may include tracking information, IoT data, and other information from a mobile device when the RF control module 304 and/or the Wi-Fi module 308 are active. In an example, the node 1000 may be configured to provide terrestrial and satellite assistance data to the UE 105.

The processor 1030 may be coupled to (or otherwise communicate with) a memory 1040, which may include one or more modules (implemented in hardware of software) to facilitate controlling the operation of the node 1000. For example, the memory 1040 may include an application module 1046 with computer code for various applications to perform operations of the node 1000. The wireless node 1000 may be configured, in some implementations, to perform location data services, or perform other types of services, for multiple wireless devices (clients) communicating with the wireless node 1000 (or communicating with a server coupled to the wireless node 1000), and to provide location data and/or assistance data to such multiple wireless devices.

The memory 1040 may include a neighbor relations controller (e.g., neighbor discovery module) 1042 to manage neighbor relations (e.g., maintaining a neighbor list 1044) and to provide other related functionality. The node 1000 may include one or more sensors (not shown) and other devices (e.g., cameras).

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, hard disk, magnetic tape, or any other magnetic medium, a CD-ROM, any other optical medium, a RAM, a PROM, EPROM, a FLASH-EPROM, or any other memory chip or cartridge.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A method for setting an operating state of a module in a mobile device, comprising:
    detecting a motion interrupt;
    loading a partial software image to enable a partial image state into the module;
    detecting a motion that meets or exceeds a threshold while in the partial image state;
    loading a full software image to enable a full image state into the module; and
    enabling the module in a full active state.

2. The method of claim 1 wherein the partial image state is a sensor only state.

3. The method of claim 1 wherein the motion interrupt is generated by an external motion detect sensor.

4. The method of claim 1 wherein the motion interrupt is detected by a power management integrated circuit.

5. The method of claim 1 wherein detecting the motion that meets or exceeds a threshold includes detecting motion continuously for a period of time.

6. The method of claim 5 wherein the period of time is 5 to 15 seconds.

7. The method of claim 1 wherein the partial image state does not include instructions for performing a navigation function or a communication function, and the full active state includes instructions for performing the navigation function or the communication function.

8. The method of claim 1 wherein loading the full image state includes activating at least one of a radio frequency control module and a Wi-Fi module.

9. The method of claim 1 wherein detecting the motion that meets or exceeds a threshold while in the partial image state includes receiving information from an external motion detect sensor via a serial interface protocol including at least one of I2C, Serial Peripheral Interface (SPI), and I3C.

10. The method of claim 1 further comprising transitioning the module to a power collapse state when the module is in the full active state and the motion that meets or exceeds a threshold is not detected for a specified time period.

11. The method of claim 10 further comprising transitioning at least one of a radio frequency control module and a Wi-Fi module to a power save mode before the module transitions to the power collapse state.

12. A mobile device, comprising:
    at least one external motion detect sensor;
    a mobile device management module operably coupled to the at least one external motion detect sensor, the mobile device management module comprising at least one processor configured to:
    detect a motion interrupt;
    load a partial software image to enable a partial image state into the mobile device management module;
    detect a motion that meets or exceeds a threshold while in the mobile device management module is in the partial image state;
    load a full software image to enable a full image state into the mobile device management module; and
    enable the mobile device management module in a full active state.

13. The mobile device of claim 12 wherein the partial image state is a sensor only state.

14. The mobile device of claim 12 wherein the motion interrupt is generated by the at least one external motion detect sensor.

15. The mobile device of claim 12 further comprising a power management integrated circuit operably coupled to the at least one external motion detect sensor and the mobile device management module, wherein the power management integrated circuit is configured to detect the motion interrupt generated by the at least one external motion detect sensor, and the at least one processor is configured to detect the motion interrupt based on a signal received from the power management integrated circuit.

16. The mobile device of claim 12 wherein the at least one processor is configured to detect the motion that meets or exceeds a threshold by detecting an indication of motion generated by the at least one external motion detect sensor for a continuous period of time.

17. The mobile device of claim 16 wherein the continuous period of time is 5 to 15 seconds.

18. The mobile device of claim 12 wherein the partial image state does not include instructions for performing a navigation function or a communication function, and the full active state includes instructions for performing the navigation function or the communication function.

19. The mobile device of claim 12 further comprising a radio frequency control module operably coupled to the mobile device management module, wherein the at least one processor is further configured to activate the radio frequency control module when enabling the mobile device management module to the full active state.

20. The mobile device of claim 12 further comprising a Wi-Fi module operably coupled to the mobile device management module, wherein the at least one processor is further configured to activate the Wi-Fi module when enabling the mobile device management module to the full active state.

21. The mobile device of claim 12 wherein the at least one processor is configured to communication with the at least one external motion detect sensor via a serial interface protocol to detect the motion that meets or exceeds a threshold while the mobile device management module is in the partial image state.

22. The mobile device of claim 12 wherein the at one processor is further configured to transition the mobile device management module to a power collapse state when the mobile device management module is in the full active state and the motion that meets or exceeds a threshold is not detected for a specified time period.

23. A method for setting a module in a mobile device to a power save mode, comprising:
    detecting a no motion state;
    determining that the no motion state persists for a specified amount of time;
    configuring a motion detect sensor interrupt prior to entering the power save mode; and
    setting the module to the power save mode.

24. The method of claim 23 wherein an external motion detect sensor is configured to detect the no motion state.

25. The method of claim 23 wherein the module is a mobile device management chipset that is operably coupled to power management integrated circuit configured to determine that the no motion state persists for the specified amount of time.

26. The method of claim 25 wherein the power management integrated circuit is configured to set the module to the power save mode via a signal on a system power management interface.

27. The method of claim 23 wherein the module is a mobile device management chipset that is operably coupled to an external motion detect sensor, and configuring the motion detect sensor interrupt includes sending a signal from the module to the external motion detect sensor.

28. A mobile device, comprising:
  at least one external motion detect sensor;
  a mobile device management module operably coupled to the at least one external motion detect sensor, the mobile device management module comprising at least one processor configured to:
    detect a no motion state;
    determine that the no motion state persists for a specified amount of time;
    configure a motion detect sensor interrupt in the at least one external motion detect sensor; and
    set the mobile device management module to a power save mode.

29. The mobile device of claim 28 wherein the mobile device management module is configured to receive an indication of no motion generated by the at least one external motion detect sensor, and the at least one processor is configured to detect the no motion state based on the indication of no motion generated by the at least one external motion detect sensor.

30. The mobile device of claim 28 further comprising a power management integrated circuit operably coupled to the at least one external motion detect sensor and the mobile device management module, wherein the power management integrated circuit is configured to receive an indication of no motion generated by the at least one external motion detect sensor, and the at least one processor is configured to detect the no motion state based on the indication of no motion received by the power management integrated circuit.

* * * * *